United States Patent
Zheng et al.

(10) Patent No.: US 11,928,712 B2
(45) Date of Patent: *Mar. 12, 2024

(54) SYSTEMS AND METHODS FOR ALLOCATION-FREE CONTROL OF ONLINE ELECTRONIC CONTENT DISTRIBUTION CAMPAIGNS

(71) Applicant: Yahoo Ad Tech LLC, Dulles, VA (US)

(72) Inventors: Qixing Zheng, Palo Alto, CA (US); Niklas Karlsson, Mountain View, CA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,676

(22) Filed: Jul. 25, 2022

(65) Prior Publication Data

US 2022/0358548 A1    Nov. 10, 2022

Related U.S. Application Data

(63) Continuation of application No. 15/880,729, filed on Jan. 26, 2018, now Pat. No. 11,436,644.

(51) Int. Cl.
*G06Q 30/0273* (2023.01)
*G06Q 30/0241* (2023.01)

(52) U.S. Cl.
CPC ..... *G06Q 30/0275* (2013.01); *G06Q 30/0247* (2013.01); *G06Q 30/0249* (2013.01)

(58) Field of Classification Search
CPC .......... G06Q 30/0275; G06Q 30/0247; G06Q 30/0249
See application file for complete search history.

(56) References Cited

U.S. PATENT DOCUMENTS 7,835,938 B1    11/2010    Karlsson
9,654,226 B1 *   5/2017    Bhandare ............. H04B 10/508
(Continued)

OTHER PUBLICATIONS

Laskawski, Michal, "Sampling Rate Impact on the Tuning of PID Controller Parameters", Mar. 1, 2016, International Journal of Electronics and Telecommunications, vol. 62, p. 43-48.
(Continued)

*Primary Examiner* — Ilana L Spar
*Assistant Examiner* — Allan J Woodworth, II
(74) *Attorney, Agent, or Firm* — Bookoff McAndrews, PLLC

(57) ABSTRACT

A computer-implemented method for allocation-free control of online campaigns for distributing online content includes receiving a daily content distribution spending budget and one or more response functions, calculating one or more plant gain estimates based on the one or more response functions, calculating a marginal content distribution spending budget based on the daily content distribution spending budget, generating one or more control signals based on the calculated marginal budget and the calculated one or more plant gain estimates, generating a price control signal based on the generated one or more control signals, and calculating a bid for one or more impressions based on the price control signal.

17 Claims, 20 Drawing Sheets

(56) References Cited

U.S. PATENT DOCUMENTS

| 2015/0088665 | A1* | 3/2015 | Karlsson | G06Q 30/0275 |
| | | | | 705/14.71 |
| 2016/0110755 | A1* | 4/2016 | Smirnov | G06Q 30/0244 |
| | | | | 705/14.43 |
| 2018/0108049 | A1* | 4/2018 | Kitts | G06Q 30/0272 |
| 2019/0034976 | A1* | 1/2019 | Hamedi | G06Q 30/0243 |

OTHER PUBLICATIONS

U.S. Appl. No. 13/416,796, filed Mar. 9, 2012.
U.S. Appl. No. 15/438,607, filed Feb. 21, 2017.
U.S. Appl. No. 15/628,493, filed Jun. 20, 2017.

* cited by examiner

| ALGORITHM 1 DELAY MODULE |
|---|
| 1: Configuration parameters: $S$ (a typical value is 1) |
| 2: Input signals: $u(k)$ |
| 3: State signals: $\{x_i \mid i = 1, 2, \ldots, S\}$ |
| 4: State initialization: $x_i = 0$ for $i = 1, 2, \ldots, S$ |
| 5: Output signals: $u_d(k)$ |
| 6: Computation: |
| 7: $u_d(k) = x_S$ |
| 8: for $i = S, S-1, \ldots, 1$ do |
| 9:     if $i == 1$ then |
| 10:       $x_i = u(k)$ |
| 11:     else |
| 12:       $x_i = x_{i-1}$ |
| 13:     end |
| 14: end |

---

ALGORITHM 2 REFERENCE GENERATOR

1: Configuration parameters: $T_S$, $\{(\beta_i, \phi_i) | i = 1, 2, \ldots, n\}$, $\{\gamma_i | i = 1, 2, \ldots, m\}$
2: Input signals: $r_D(d)$
3: Output signals: $r_M(k)$
4: Computation:
5: $r_M(k) = 0$
6: for $i = 1, 2, \ldots, m$ do
7:     $V = 1$
8:     for $j = 1, 2, \ldots, n$ do
9:         $V = V + \beta_j \sin\left(\frac{2\pi(k-i+1)}{24} + \phi_j\right)$
10:     end
11:     $r_M(k) = r_M(k) + \gamma_i V$
12: end
13: $r_M(k) = T_S r_D(d) r_M(k)/24$

---

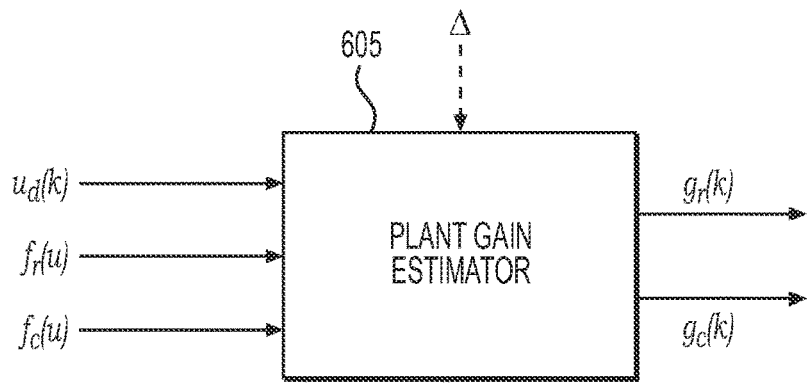

ALGORITHM 3 PLANT GAIN ESTIMATOR

1: Configuration parameters: $\Delta$
2: Input signals: $u_d(k), f_r(u), f_c(u)$
3: Output signals: $g_r(k), g_c(k)$
4: Computation:
5: if $f_r(u)$ is a linear expansion of differentiable basis
functions, i.e., $f_r(u) = \sum_{i=1}^{N_r} \left[ \hat{\theta}_{r,i} B_{r,i}(u) \right]$ then
6:     $g_r(k) = 0$
7:     for $i = 1, 2, \ldots, N_r$ do
8:         $g_r(k) = g_r(k) + \hat{\theta}_{r,i} B'_{r,i}(u_d(k))$
9:     end
10: else
11:     $g_r(k) = [f_r(u_d(k) + \Delta) - f_r(u_d(k))]/\Delta$
12: end
13:
14: if $f_c(u)$ is a linear expansion of differentiable basis
functions, i.e., $f_c(u) = \sum_{i=1}^{N_c} \left[ \hat{\theta}_{c,i} B_{c,i}(u) \right]$ then
15:     $g_c(k) = 0$
16:     for $i = 1, 2, \ldots, N_c$ do
17:         $g_c(k) = g_c(k) + \hat{\theta}_{c,i} B'_{c,i}(u_d(k))$
18:     end
19: else
20:     $g_c(k) = [f_c(u_d(k) + \Delta) - f_c(u_d(k))]/\Delta$
21: end

*FIG. 9B*

ALGORITHM 4 REVENUE CONTROLLER

1: Configuration parameters: $T_s, T_r, T_{r,w}, K_{r,I}, u_{min}, u_{max}, \delta_{r,low}, \delta_{r,high}, U_0$
2: Input signals: $r_M(k), y_r(k), g_r(k), u_{s2r}(k-1)$
3: State signals: $I_r, U_r$
4: State initialization: $I_r = 0, U_r = U_0$
5: Output signals: $u_r(k)$
6: Computation:
7: if $u_{s2r}(k-1) \;!= [\;]$ then
8:     // reset states per control supervisor
9:     $I_r = u_{s2r}(k-1)$
10:     $U_r = u_{s2r}(k-1)$
11: end
12: $E = r_M(k) - y_r(k)$   // error is the difference between the reference and the observed delivery
13: $K_p = K_{r,I}/g_r(k)$   // calculate the controller gain
14: $P = K_p E$   // calculate the proportional term
15: $I_{temp} = I_r + \frac{K_p T_s}{T_r} E$   // calculate the integral term
16: $U_{temp} = P + I_{temp}$   // calculate the unbounded control signal
17:
18: // determine upper and lower bounds for the control signal
19: if $u_{min} \geq U_r(1 + \delta_{r,high})$ or $u_{max} \leq U_r(1 - \delta_{r,low})$ then
20:     // use the min/max values placed by the clients
21:     $u_{low} = u_{min}$
22:     $u_{high} = u_{max}$
23: else
24:     $u_{low} = \max(U_r(1 - \delta_{r,low}), u_{min})$
25:     $u_{high} = \min(U_r(1 + \delta_{r,high}), u_{max})$
26: end
27: // apply upper and lower bounds
28: if $U_{temp} < u_{low}$ then
29:     $u_r(k) = u_{low}$
30: else if $U_{temp} > u_{high}$ then
31:     $u_r(k) = u_{high}$
32: else
33:     $u_r(k) = U_{temp}$
34: end
35: // update state $I$ with anti-windup protection
36: $I_r = I_{temp} + (u_r(k) - U_{temp})/T_{r,w}$
37: // update state $U_r$
38: $U_r = u_r(k)$

FIG. 10B

ALGORITHM 5 CPX ESTIMATOR

1: Configuration parameters: $N^{long}$, $N^{short}$
2: Input signals: $y_r(k)$, $y_e(k)$
3: State signals: $\{R_i | i = 1, 2, \ldots, N^{long}\}$, $\{E_i | i = 1, 2, \ldots, N^{long}\}$
4: State initialization: $R_i = 0$ for $i = 1, 2, \ldots, N^{long}$, $E_i = 0$ for $i = 1, 2, \ldots, N^{long}$
5: Output signals: $\hat{y}_c^{short}(k)$, $\hat{y}_c^{long}(k)$
6: Computation:
7: // update buffers of spending and event measurements
8: for $i = N^{long}, N^{long} - 1, \ldots, 2$ do
9:      $R_i = R_{i-1}$
10:     $E_i = E_{i-1}$
11: end
12: $R_1 = y_r(k)$
13: $E_1 = y_e(k)$
14: // calculate total spending and total events
15: $R^{short} = 0$
16: $E^{short} = 0$
17: for $i = 1, \ldots, N^{short}$ do
18:     $R^{short} = R^{short} + R_i$
19:     $E^{short} = E^{short} + E_i$
20: end
21: $R^{long} = R^{short}$
22: $E^{long} = E^{short}$
23: for $i = N^{short} + 1, \ldots, N^{long}$ do
24:     $R^{long} = R^{long} + R_i$
25:     $E^{long} = E^{long} + E_i$
26: // calculate CPX estimates
27: if $E^{long} == 0$ then
28:     $\hat{y}_c^{long}(k) = [\,]$
29: else
30:     $\hat{y}_c^{long}(k) = R^{long}/E^{long}$
31: end
32: if $E^{short} == 0$ then
33:     $\hat{y}_c^{short}(k) = [\,]$
34: else
35:     $\hat{y}_c^{short}(k) = R^{short}/E^{short}$
36: end

*FIG. 11B*

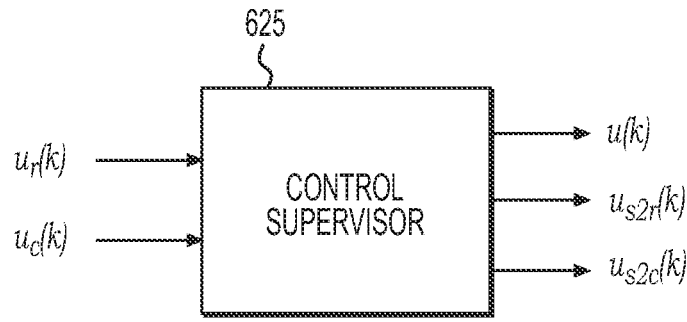

FIG. 12A

| ALGORITHM 7 CONTROL SUPERVISOR |
|---|
| 1: Configuration parameters: |
| 2: Input signals: $u_r(k)$, $u_c(k)$ |
| 3: State signals: |
| 4: Output signals: $u(k)$, $u_{s2r}(k)$, $u_{s2c}(k)$ |
| 5: Computation: |
| 6: $u_{s2r}(k) = [\ ]$ |
| 7: $u_{s2c}(k) = [\ ]$ |
| 8: if $u_c(k) == [\ ]$ or $u_r(k) < u_c(k)$ then |
| 9:      // engage revenue controller |
| 10:     $u(k) = u_r(k)$ |
| 11:     // reset CPX controller states |
| 12:     $u_{s2c}(k) = u(k)$ |
| 13: else |
| 14:     // engage CPX controller |
| 15:     $u(k) = u_c(k)$ |
| 16:     // reset revenue controller states |
| 17:     $u_{s2r}(k) = u(k)$ |
| 18: end |

FIG. 12B

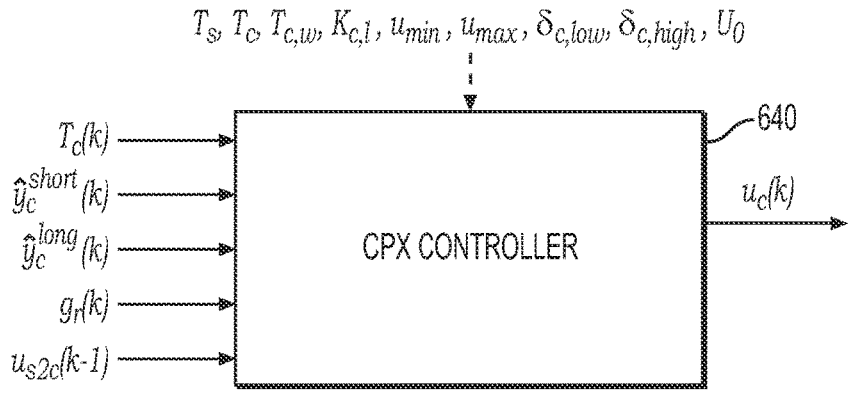

ALGORITHM 6 CPX CONTROLLER (PART 1)

1: Configuration parameters: $T_s, T_c, T_{c,w}, K_{c,l}, u_{min}, u_{max}, \delta_{c,low}, \delta_{c,high}, U_0$
2: Input signals: $r_c(k), \hat{y}_r^{short}(k), \hat{y}_r^{long}(k), g_c(k), u_{s2c}(k-1)$
3: State signals: $I_c, U_c$
4: State initialization: $I_c = 0, U_c = U_0$
5: Output signals: $u_c(k)$
6: Computation:
7: if $u_{s2c}(k-1) \, ! = [\,]$ then
8:     // reset states per control supervisor
9:     $I_c = u_{s2c}(k-1)$
10:     $U_c = u_{s2c}(k-1)$
11: end
12: if $r_c == [\,]$ or ($\hat{y}_r^{short}(k) == [\,]$ and $\hat{y}_r^{long}(k) == [\,]$) then
13:     // clear CPX control when there is no CPX constraint or no estimate is available
14:     $u_c(k) = [\,]$
15:     End Computation
16: else if $\hat{y}_r^{short}(k) == [\,]$ or $\hat{y}_r^{long}(k) == [\,]$ then
17:     // freeze CPX control when there is only one CPX estimate
18:     $u_c(k) = U_c$
19:     End Computation
20: else if $\hat{y}_r^{short}(k) < \gamma_{low} r_c(k)$ or $\hat{y}_r^{long}(k) < \gamma_{low} r_c(k)$ then
21:     // clear CPX control when CPX constraint is met with margin
22:     $u_c(k) = [\,]$
23:     End Computation
24: else if $\hat{y}_r^{short}(k) < \gamma_{high} r_c(k)$ or $\hat{y}_r^{long}(k) < \gamma_{high} r_c(k)$ then
25:     // freeze CPX control when one CPX estimate is not exceeding constraint by $\gamma_{high}$ - 1
26:     $u_c(k) = U_c$
27:     End Computation
28: end

FIG. 13B

ALGORITHM 6 CPX CONTROLLER (PART 2)

29: $E = r_c(k) - \hat{y}_c^{short}(k)$   // error is the difference between the constraint and the short-horizon estimate
30: $K_p = K_{c,1}/g_c(k)$   // calculate the controller gain
31: $P = K_p E$   // calculate the proportional term
32: $I_{temp} = I_c + \frac{K_p T_s}{T_c} E$   // calculate the integral term
33: $U_{temp} = P + I_{temp}$   // calculate the unbounded control signal
34:
35: // determine upper and lower bounds for the control signal
36: if $u_{min} \geq U_c(1 + \delta_{c,high})$ or $u_{max} \leq U_c(1 - \delta_{c,low})$ then
37:   // use the min/max values placed by the clients
38:   $u_{low} = u_{min}$
39:   $u_{high} = u_{max}$
40: else
41:   // use the tighter bound between allowable max change per time sample and the min/max
42:   $u_{low} = \max(U_c(1 - \delta_{c,low}), u_{min})$
43:   $u_{high} = \min(U_c(1 + \delta_{c,high}), u_{max})$
44: end
45: // apply upper and lower bounds
46: if $U_{temp} < u_{low}$ then
47:   $u_c(k) = u_{low}$
48: else if $U_{temp} > u_{high}$ then
49:   $u_c(k) = u_{high}$
50: else
51:   $u_c(k) = U_{temp}$
52: end
53: // update state $I_c$ with anti-windup protection
54: $I_c = I_{temp} + (u_c(k) - U_{temp})/T_{c,w}$
55: // update state $U_c$
56: $U_c = u_c(k)$

*FIG. 13C*

SYSTEMS AND METHODS FOR ALLOCATION-FREE CONTROL OF ONLINE ELECTRONIC CONTENT DISTRIBUTION CAMPAIGNS

CROSS-REFERENCE TO RELATED APPLICATION(S)

This patent application is a continuation of and claims the benefit of priority to U.S. application Ser. No. 15/880,729, filed on Jan. 26, 2018, the entirety of which is incorporated herein by reference.

TECHNICAL FIELD

Various embodiments of the present disclosure relate generally to online distribution of electronic content and, more particularly, to systems and methods for allocation control-free bidding in an online campaign for distribution of electronic content.

BACKGROUND

Internet advertisers often create online campaigns for distribution of electronic content that include numerous items of electronic content such as, for example, advertisements (e.g., "banner ads") designed to be placed on websites during a specified period of time. For example, a company may design several advertisements for a product or service offered by the company. The company may wish to have the advertisements placed on websites to promote the product or service. Each time one of these items of electronic content, such as an advertisement, is placed on a website is known as an "impression." When a user views the item of electronic content, the user may select, or "click," on the item of electronic content or may take another "action" such as completing an online form to request additional information with regard to an advertised product or service. If the user later purchases the product or services, the purchase is referred to as a "conversion" of the impression.

Providers of electronic content may be interested in impressions (e.g., when trying to increase awareness of a product or service), clicks (e.g., when trying to provide more information about a product or service), or conversions (e.g., when trying to make sales of a product or service). Providers of electronic content may pay based on, for example, impressions, clicks, or conversions over the course of a campaign for distribution of electronic content, hereinafter merely referred to as a "campaign." A provider may have a spending plan that specifies how the provider wishes to spend a budget that has been allocated for the campaign. For instance, the provider may wish to spend money only on certain days, or certain times of day, during the campaign, or may wish to spend evenly over the duration of the campaign. Each provider may have a daily budget (e.g., $1,000 per day) and/or a daily goal of impression volume (e.g., 1000 impressions per day), known as "maximum daily delivery" or "daily pacing." Each advertiser may also desire a campaign to perform certain types of consumer targeting (e.g., based on a demographic analysis) and/or achieve a particular distribution of electronic content across various websites ("spreading").

As a result, various techniques are used to manage online delivery within and among campaigns. In certain content distribution networks, servers receive impression requests from publishers (e.g., websites or other entities with an inventory of online space for distributed electronic content). The servers may group requests from various campaigns, e.g., according to impressions to be "targeted" based on a combination of attributes defined by the requests. In addition to targeting attributes, each request received from providers of electronic content generally includes a "bid price" and sometimes a "bid allocation." The bid price is the amount of money offered by the request for placement of the targeted impression. The bid allocation, if present, is the percentage or ratio (e.g., point value from 0 to 1) of targeted inventory the campaign is willing to purchase at the bid price. The list of electronic content that target a certain impression request may be sorted in descending order according to their bid prices, and then placed in groups such that the sum of their bid allocations equals 1. If the request with the highest bid price has a bid allocation of 1, or if there is no restriction on bid allocation, it will win the impression. Such delivery methods ensure that the highest bidding content provider is able to purchase as much inventory as desired. These methods also reveal both the marginal value of the impression inventory (e.g., the cost required per impression), and the amount of volume (e.g., the number of impressions) purchased at each price. A campaign utilizing both a "bid price" and a "bid allocation" may be referred to a "dual lever" campaign control system.

The competitive bidding in an online advertising marketplace, for example, may be less than ideal, however, from the perspective of the advertiser. Conventional online advertising campaigns control delivery in a way that balances advertisers' return on investment with overall revenue, which may prevent delivery of impressions at minimum cost to the advertiser. Put another way, conventional online advertising campaigns could be improved to better optimize performance (e.g., cost per event) in favor of the advertiser.

In addition, in a "dual lever" campaign control system, when the allocation signal is smaller than 1, the campaign may submit bids for only a fraction of available impressions and may not participate in the bidding of some high return on investment (value over cost) impressions, which may result in suboptimal cost performance.

The present disclosure is directed to overcoming one or more of these above-referenced challenges.

SUMMARY OF THE DISCLOSURE

According to certain aspects of the present disclosure, systems and methods are disclosed for allocation-free control of online campaigns for the distribution of electronic content.

In one embodiment, a computer-implemented method is disclosed for allocation-free control of online campaigns for distributing online content, the method comprising: receiving a daily content distribution spending budget and one or more response functions, calculating one or more plant gain estimates based on the one or more response functions, calculating a marginal content distribution spending budget based on the daily content distribution spending budget, generating one or more control signals based on the calculated marginal budget and the calculated one or more plant gain estimates, generating a price control signal based on the generated one or more control signals, and calculating a bid for one or more impressions based on the price control signal.

In accordance with another embodiment, a system is disclosed for allocation-free control of online campaigns for distributing online content, the system comprising: a data storage device storing instructions for allocation-free control of online campaigns for distributing online content in an electronic storage medium; and a processor configured to execute the instructions to perform a method including: receiving a daily content distribution spending budget and one or more response functions, calculating one or more plant gain estimates based on the one or more response functions, calculating a marginal content distribution spending budget based on the daily content distribution spending budget, generating one or more control signals based on the calculated marginal budget and the calculated one or more plant gain estimates, generating a price control signal based on the generated one or more control signals, and calculating a bid for one or more impressions based on the price control signal.

In accordance with another embodiment, a non-transitory machine-readable medium storing instructions that, when executed by the a computing system, causes the computing system to perform a method for allocation-free control of online campaigns for distributing online content, the method including: receiving a daily content distribution spending budget and one or more response functions, calculating one or more plant gain estimates based on the one or more response functions, calculating a marginal content distribution spending budget based on the daily content distribution spending budget, generating one or more control signals based on the calculated marginal budget and the calculated one or more plant gain estimates, generating a price control signal based on the generated one or more control signals, and calculating a bid for one or more impressions based on the price control signal.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that a campaign control system may bid on all available impressions, and may win a desired number of impressions at a lower bid price when compared to bidding on a fraction of available impressions. The disclosed systems and methods discussed below may allow a reduction in the cost and/or an increase in the total number of resulting impressions, viewed impressions, clicks or actions of a campaign for the providers.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 9A depicts a plant gain estimator in a control system for allocation-free control of online campaigns for distributing online content, according to one or more embodiments.

FIG. 9B depicts a sample algorithm for a plant gain estimator in a control system for allocation-free control of online campaigns for distributing online content, according to one or more embodiments.

FIG. 10B depicts a sample algorithm for a revenue controller in a control system for allocation-free control of online campaigns for distributing online content, according to one or more embodiments.

FIG. 11B depicts a sample algorithm for a CPX estimator in a control system for allocation-free control of online campaigns for distributing online content, according to one or more embodiments.

FIG. 12A depicts a control supervisor in a control system for allocation-free control of online campaigns for distributing online content, according to one or more embodiments.

FIG. 12B depicts a sample algorithm for a control supervisor in a control system for allocation-free control of online campaigns for distributing online content, according to one or more embodiments.

FIG. 13A depicts a CPX controller in a control system for allocation-free control of online campaigns for distributing online content, according to one or more embodiments.

FIGS. 13B-C depict a sample algorithm for a CPX controller in a control system for allocation-free control of online campaigns for distributing online content, according to one or more embodiments.

DETAILED DESCRIPTION OF EMBODIMENTS

Figure 1:
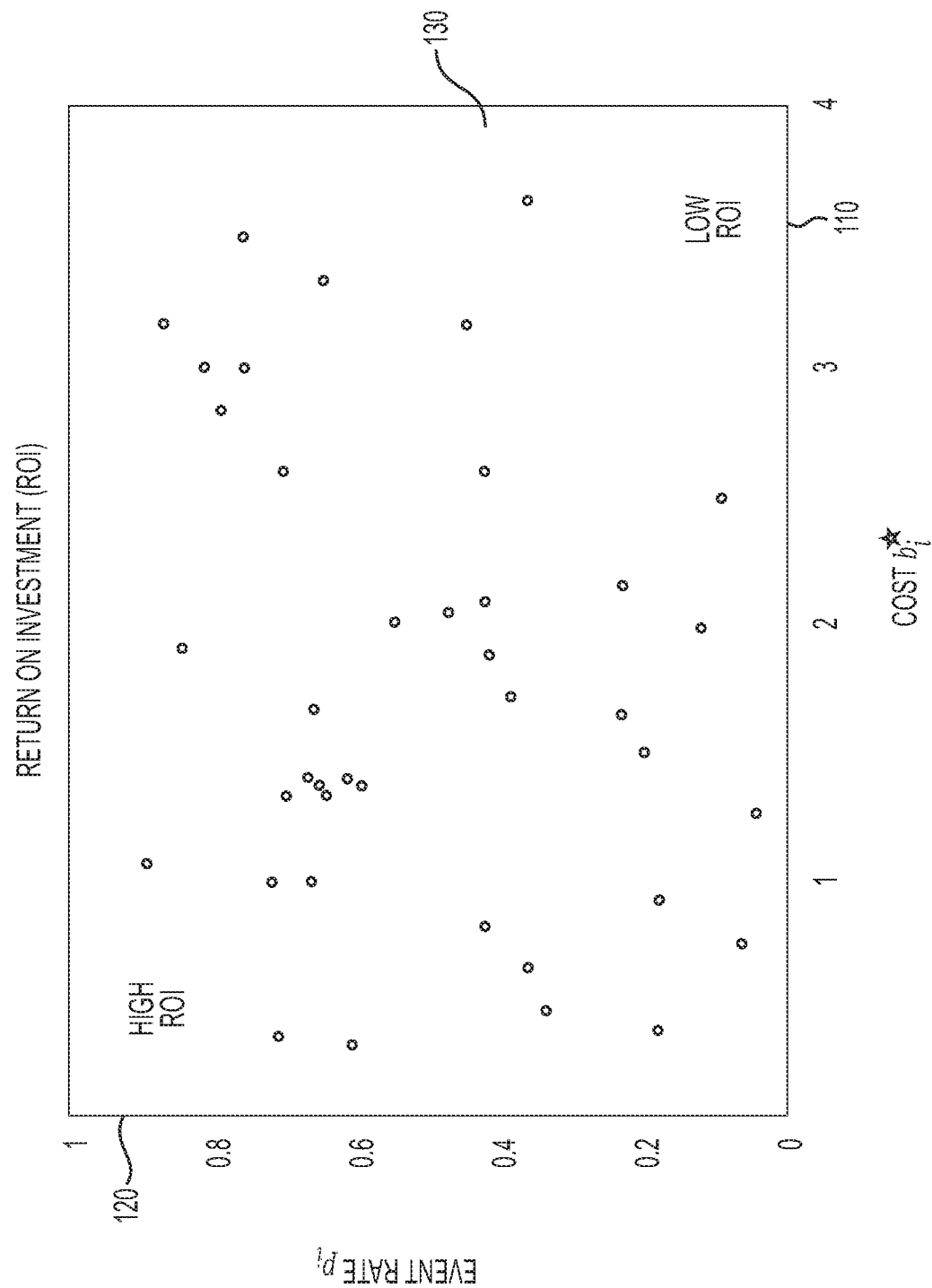
FIG. 1 depicts a graph of a return on investment (ROI) for sample content distribution impressions.

Various embodiments of the present disclosure relate generally to allocation-free control of online campaigns for distributing online content.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

In any given moment, thousands of online campaigns for distributing online content may be running simultaneously. Associated with each campaign, there may be a total budget defined in terms of an amount of money or a number of impressions. Each campaign may also include a requirement that the budget should be spent smoothly throughout the duration of the campaign as well as within every day. This constraint is known as pacing. In addition, the campaigns may have optimization objectives. For each campaign, the bidding strategy set by an automated algorithm should maximize an objective function aligned with an optimization objective of that campaign. Such optimization objectives may include minimizing cost per thousand impressions (eCPM), minimizing cost per click (eCPC), minimizing cost per action (eCPA), minimizing cost per viewed impression (eCPV) and minimizing cost per completed view (eCPCV).

As discussed above, a common feedback controller is a dual-lever control, comprising two control signals: a price control signal that adjusts the bid price and an allocation (pacing rate) control signal that is between 0 and 1 determining the sampled fraction of impressions for which the campaign submits bids (e.g., a 0.9 allocation means the campaign participates in 90% of impressions available to the campaign). One or more embodiments relate to campaign control in a sealed second price auction framework. A control system according to one or more embodiments may fix the allocation signal at a value of one ("1"), 1/1, or 100%, meaning that the control system submits bids for all available impressions. Such a control system, by bidding on all available impressions, may win a desired number of impressions at a lower bid price when compared to bidding on a fraction of available impressions, thus potentially reducing the cost for the advertisers. In addition, by using a fixed value for the allocation signal, the complexity of the campaign control system may be reduced, potentially enhancing the maintainability of the control system and simplifying trouble shooting of the control system.

A control system according to one or more embodiments may generally include: a plant gain estimator, a revenue controller, a CPX (cost-per-event) controller, and a control supervisor. The plant gain estimator may utilize information generated by a forecasting system to calculate estimates of a plant gain for the campaign for distribution of electronic content. A "plant," in this context, may be considered a mapping from a price control signal to a system output such as, for example, campaign-level revenue and cost per event, etc. As used herein, an "event" refers to any action taken with respect to an item of electronic content (e.g., impression, click, or conversion).

A revenue control signal generated by the revenue controller may be determined by the revenue controller based on, for example, a difference or "distance" between a desired campaign revenue spending and a measured campaign revenue spending. Such adjustment may be performed at each time sample, or at any other suitable period. The amount of adjustment may be controlled, for example, by a gain of a proportional-integral controller, which may be adaptively updated based on the plant gain estimates from the plant gain estimator.

Similarly, a CPX control signal may be determined by the CPX controller based on a difference or "distance" between a CPX constraint and estimates of cost per event generated by a CPX estimator, such as when the estimated cost per event is larger than the constraint. The control supervisor may compare the revenue control signal and the CPX control signal and may, for example, choose the smaller of the two control signals to be the price control signal, which may be sent to a bid generator to calculate a bid price. The calculated bid price may be, for example, equal to the product of the price control signal and the event rate estimate.

Figure 2:
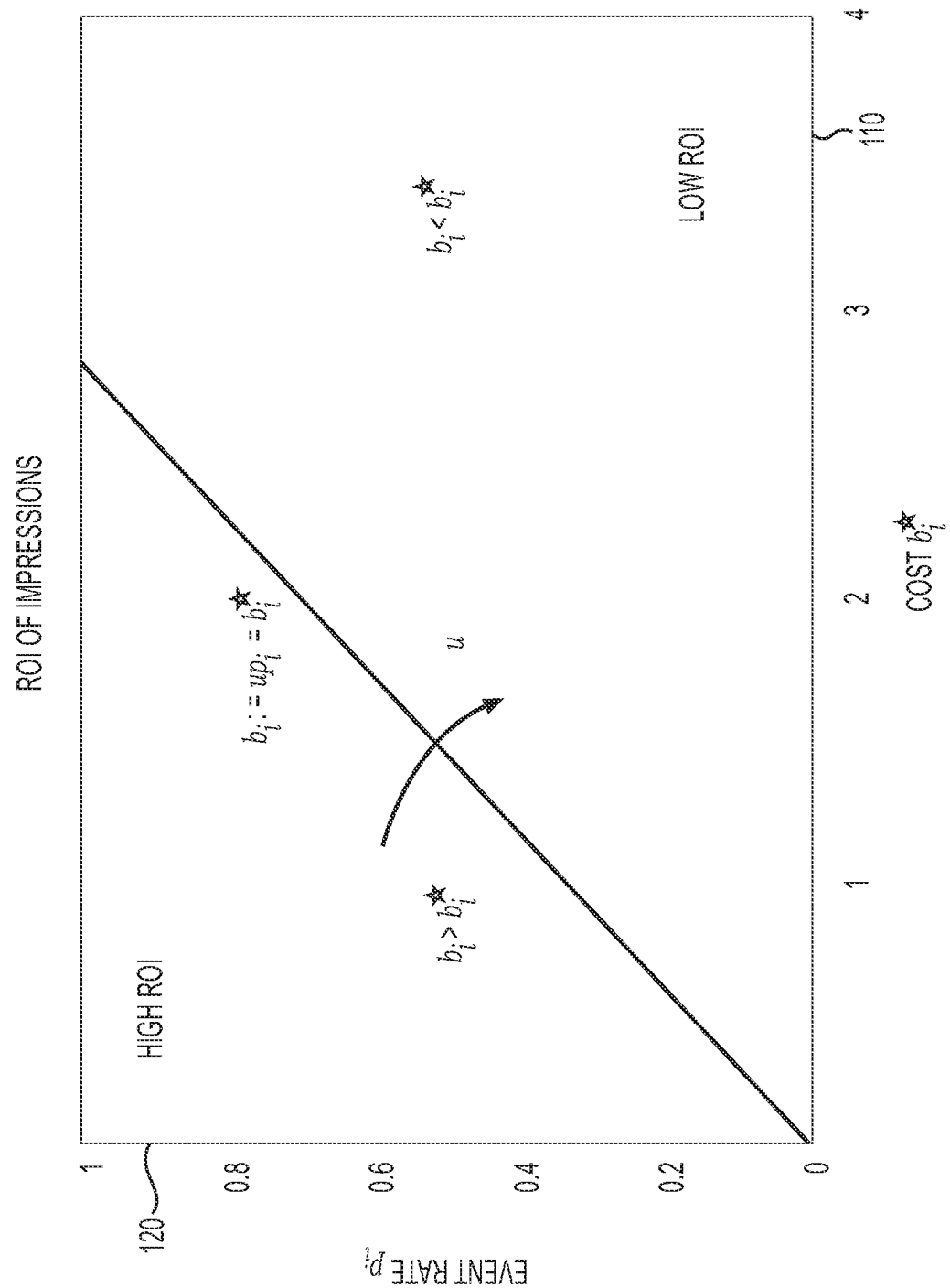
FIG. 2 depicts a graphical representation of an optimal solution for electronic content distribution campaign control.

FIG. 1 depicts a graph of a return on investment (ROI) for sample content distribution impressions. As shown in FIG. 1, each content distribution impression 130 is associated with a cost $b^*_i$ and an event rate $p_i$. Impressions having a high event rate and a low cost have a high ROI. Impressions having a low event rate and a high cost have a low ROI. An electronic content distribution control system according to one or more embodiments may seek to maximize total value, such as a maximum number of clicks in eCPC or a maximum number of actions in eCPA. However, these goals may be subject to restraints on total cost as being less than a specified maximum budget and/or on a cost per event as being less than a specified cost constraint. FIG. 2 depicts a graphical representation of an optimal solution for control of a campaign for distribution of electronic content in a sealed second price auction framework. As shown in FIG. 2, high ROI impressions have a bid price $b_i$ that is greater than the highest competing bid $b^*_i$. Low ROI impressions have a bid price $b_i$ that is less than the highest competing bid $b^*_i$. The line u indicates an optimal solution u at which bid price $b_i$ is equal to the highest competing bid $b^*_i$. However, the optimal solution u may change over time as the operating conditions for the campaign change.

Any suitable system infrastructure may be put into place to allow allocation-free control of online campaigns for distributing online content. FIGS. 3, 4, 6, and 17 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 3, 4, 6, and 17. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
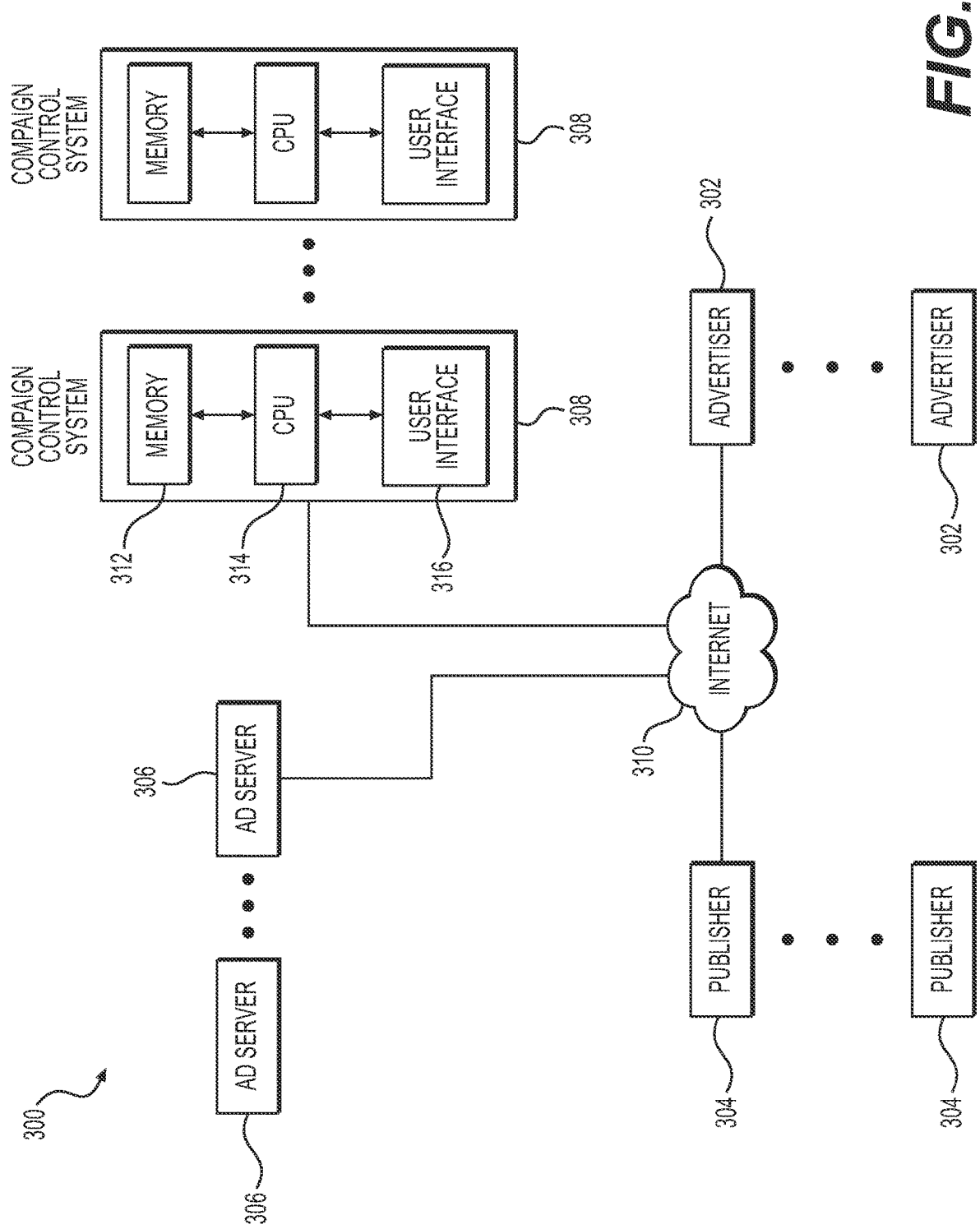
FIG. 3 depicts an illustrative electronic content distribution system, according to one or more embodiments.

FIG. 3 depicts an illustrative electronic content distribution system 300, in accordance with embodiments of the present disclosure. As shown in FIG. 3, electronic content distribution system 300 may include one or more providers of electronic content, such as advertisers, 302, publishers 304, electronic content servers, such as advertising servers, 306, and campaign control systems 308, that are in communication with one another through an electronic network, such as the Internet 310. The number and orientation of the computing components in FIG. 3 is provided for purposes of illustration only. Any other number and orientation of components is possible. For example, one or more of providers of electronic content 302, publishers 304, ad servers 306, and campaign control systems 308 may be combined or co-located and/or communicate directly with one another, instead of over Internet 310. The components of FIG. 3 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Providers, such as advertisers 302, represent computing components associated with entities having online electronic content (e.g., banner ads, pop-ups, etc.) that the entities desire to deliver to online consumers. Providers 302 may interact with publishers 304, servers 306, and/or campaign control systems 308 through the Internet 310. Thus, providers 302 may be able to communicate electronic content information, such as ad information, targeting information, consumer information, budget information, bidding information, etc., to other entities in system 300.

Publishers 304 represent computing components associated with entities having inventories of available online electronic content space. For example, publishers 304 may include computing components associated with online content providers, search engines, e-mail programs, web-based applications, or any computing component or program having online user traffic. Publishers 304 may interact with providers 302, electronic content servers 306, and/or controllers 308 via the Internet 310. Thus, publishers 304 may be able to communicate inventory information, such as site information, demographic information, cost information, etc., to other computing components in system 300.

Electronic content servers, such as advertising servers 306, may include servers or clusters of servers configured to process electronic content information from providers 302 and/or inventory information from publishers 304, either directly or indirectly. In certain embodiments, ad servers 306 may be remote web servers that receive electronic content information from providers 302 and serve ads to be placed by publishers 304. Servers 306 may be configured to serve electronic content across various domains of publishers 304, for example, based on electronic content information provided by providers 302. Servers 306 may also be configured to serve electronic content based on contextual targeting of web sites, search results, and/or user profile information. In some embodiments, servers 306 may be configured to serve electronic content based on control signals generated by campaign control systems 308.

Campaign control systems 308 may include computing systems configured to receive information from computing components in system 300, process the information, and generate control signals to be sent to other computing components in system 300, according to the illustrative methods described herein. Campaign control systems 308 may include any type or combination of computing systems, such as clustered computing machines and/or servers, including virtual computing machines and/or virtual servers. Campaign control systems 308 may include, for example, implementations of open platforms for machine-learning or other automated feedback or learning from online campaigns, such as, for example, the "Adlearn™ Open Platforms" (AOP) control systems offered by Oath (Americas), Inc. of New York, New York In some embodiments, campaign control systems 308 may include an assembly of hardware, including a memory 312, a central processing unit ("CPU"), and/or a user interface 316. Memory 312 may include any type of RAM or ROM embodied in a physical, computer-readable storage medium, such as magnetic storage including floppy disk, hard disk, or magnetic tape; semiconductor storage such as solid state disk (SSD) or flash memory; optical disc storage; or magneto-optical disc storage. CPU 314 may include one or more processors for processing data according to instructions stored in the memory, for example to perform the methods and processes discussed in detail herein. The functions of the processor may be provided by a single dedicated processor or by a plurality of processors. Moreover, the processor may include, without limitation, digital signal processor (DSP) hardware, or any other hardware capable of executing software. User interface 316 may include any type or combination of input/output devices, such as a display monitor, graphical user interface, touch-screen or pad, keyboard, and/or mouse. In other embodiments, campaign control systems 308 may include virtual representations of hardware operating, for example, on a virtualization server.

Figure 4:
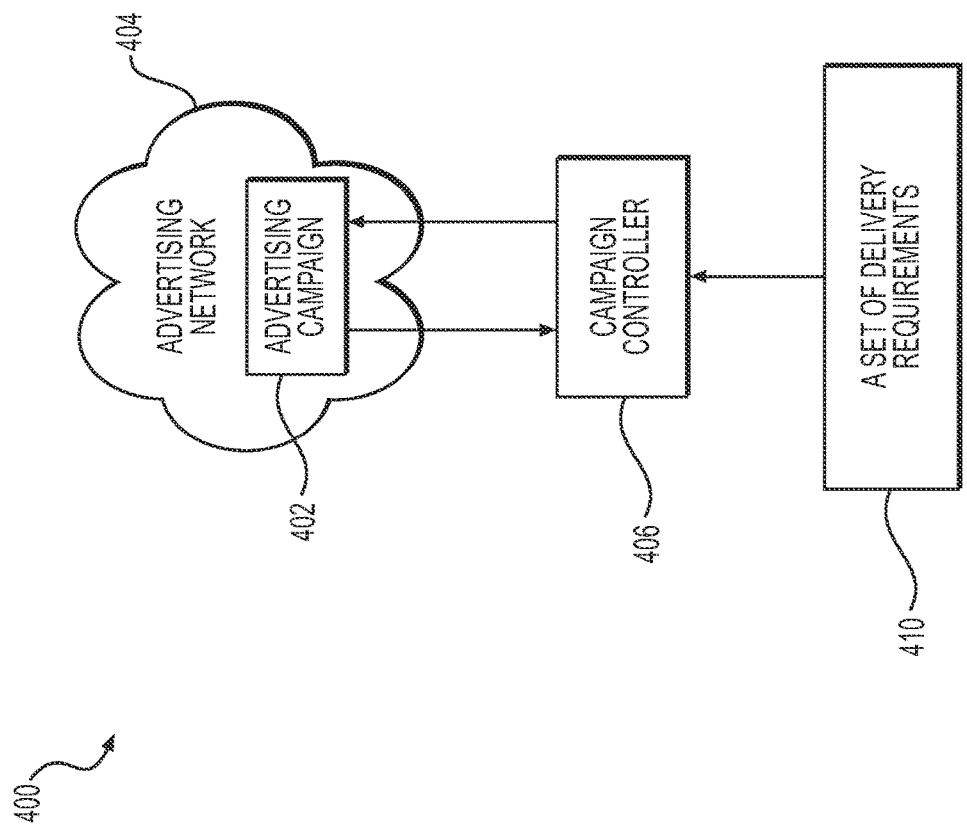
FIG. 4 depicts an illustrative online electronic content distribution control system for controlling an online campaign for distribution of electronic content operating in an online content distribution network, according to one or more embodiments.

FIG. 4 depicts an illustrative online control system 400 for controlling an online content distribution campaign, such as advertising campaign 402, operating in an online electronic content network, such as advertising network 404. Network 404 may include a network or collection of one or more providers 302, one or more publishers 304, severs 306, campaign control systems 308, or other components of system 300 depicted in FIG. 3. Elements of network 404 may operate to receive impression requests associated with one or more ad inventories, e.g., from publishers 304 such as websites or other computing components with an inventory of online ad space. Network 404 may also group impression requests for various campaigns, e.g., according to impressions to be "targeted" based on a combination of attributes defined by the content distribution requests. Network 404 may also accept bids (e.g., from one or more campaign control systems 308) on the impression requests and process the bids to serve content to the impression requests.

Any number or type of campaigns 402 may be operated within network 404, across various ad servers and domains associated with the Internet. Control system 400 may be implemented by one or more of the providers 302, publishers 304, ad servers 306, and/or controllers 308 described in FIG. 1. For example, control system 400 may represent the interaction of one or more of controllers 308 with other computing components in system 300.

Figure 6:
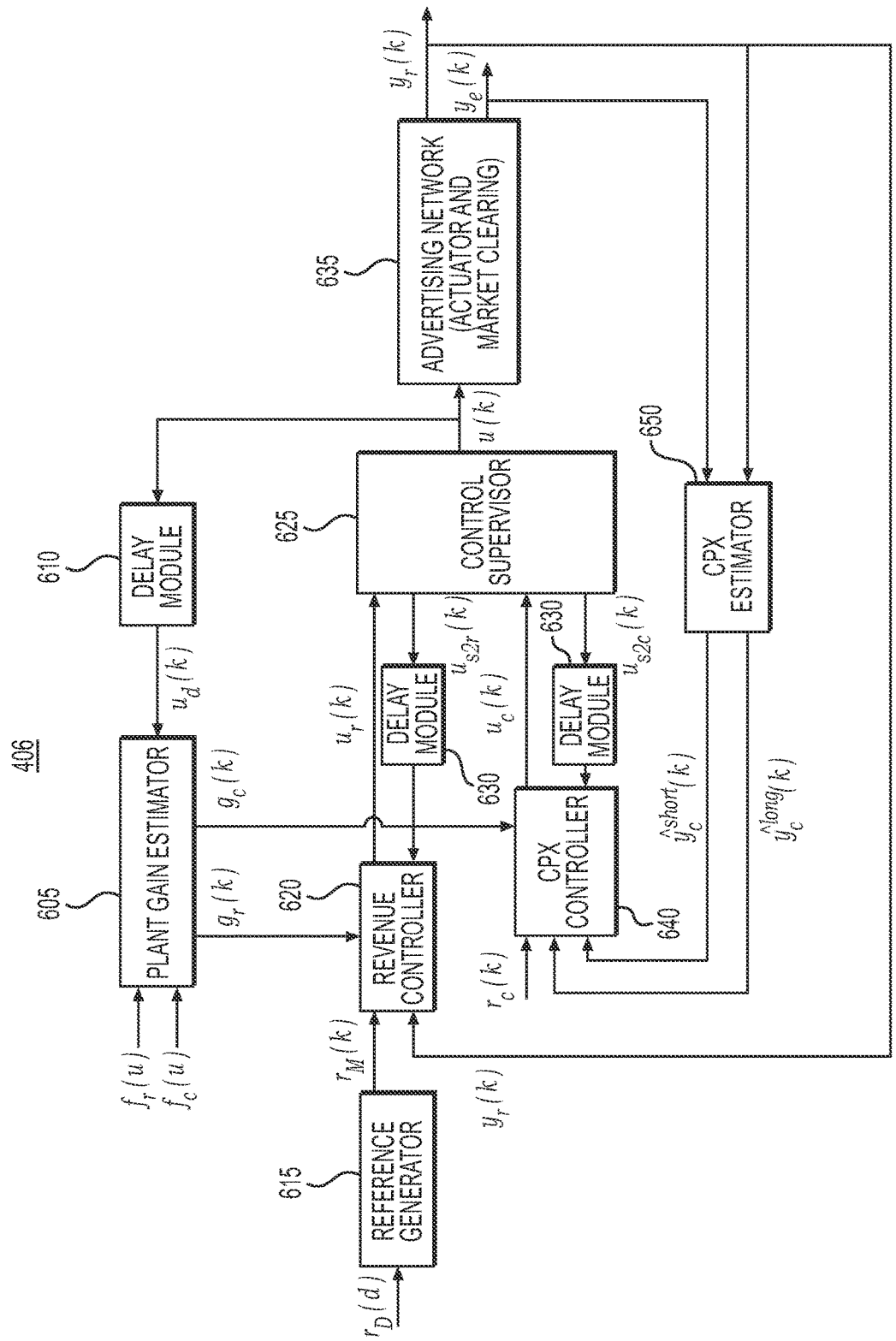
FIG. 6 depicts a control system for allocation-free control of online campaigns for distributing online content, according to one or more embodiments.

In one embodiment, control system 400 may include, among other control modules, one or more instances of campaign controller 406. Campaign controller 406 may comprise computers or servers connected to the Internet. Such computers or servers may be configured as described with respect to campaign control system 308, as depicted by FIG. 6, or in any other suitable configuration. Alternatively, campaign controller 406 may be implemented by software modules executed by CPUs 314 of controllers 308. Campaign controller 406 may be embodied entirely in hardware, entirely in software, or in any combination of hardware and software.

Campaign controller 406 may be provided with a set of delivery requirements 410, which may be adjustable design parameters set by a user. For instance, the set of delivery requirements may include cost requirements (e.g., the maximum cost discussed in reference FIG. 3 or 4), pacing requirements (e.g., daily budget goals, daily impression delivery goals), targeting requirements (e.g., based on a demographic analysis), and/or spread requirements (e.g. to control content distribution across inventory units/cells, and/or user targets, etc.). The set of delivery requirements 410 may be implemented by one or more controllers of system 400, including campaign controller 406.

In one embodiment, campaign controller 406 may be a controller configured to assist a campaign 402 in meeting pacing goals at minimum cost to the provider. In accordance with the disclosed embodiments, campaign controller 406 may be configured to control bid price, and optionally allocation signals, to optimize the revenue spending of the campaign in accordance with an objective set by a user. Such objectives may include, for example, a smoothness objective in which campaign controller 406 manages campaign delivery to achieve smoothness in revenue spending over the course of the campaign. In one embodiment, campaign controller 406 may implement at least some of the illustrative systems and methods described in U.S. patent application Ser. No. 13/416,796, filed on Mar. 9, 2012, the entire disclosure of which is incorporated herein by reference.

Figure 5:
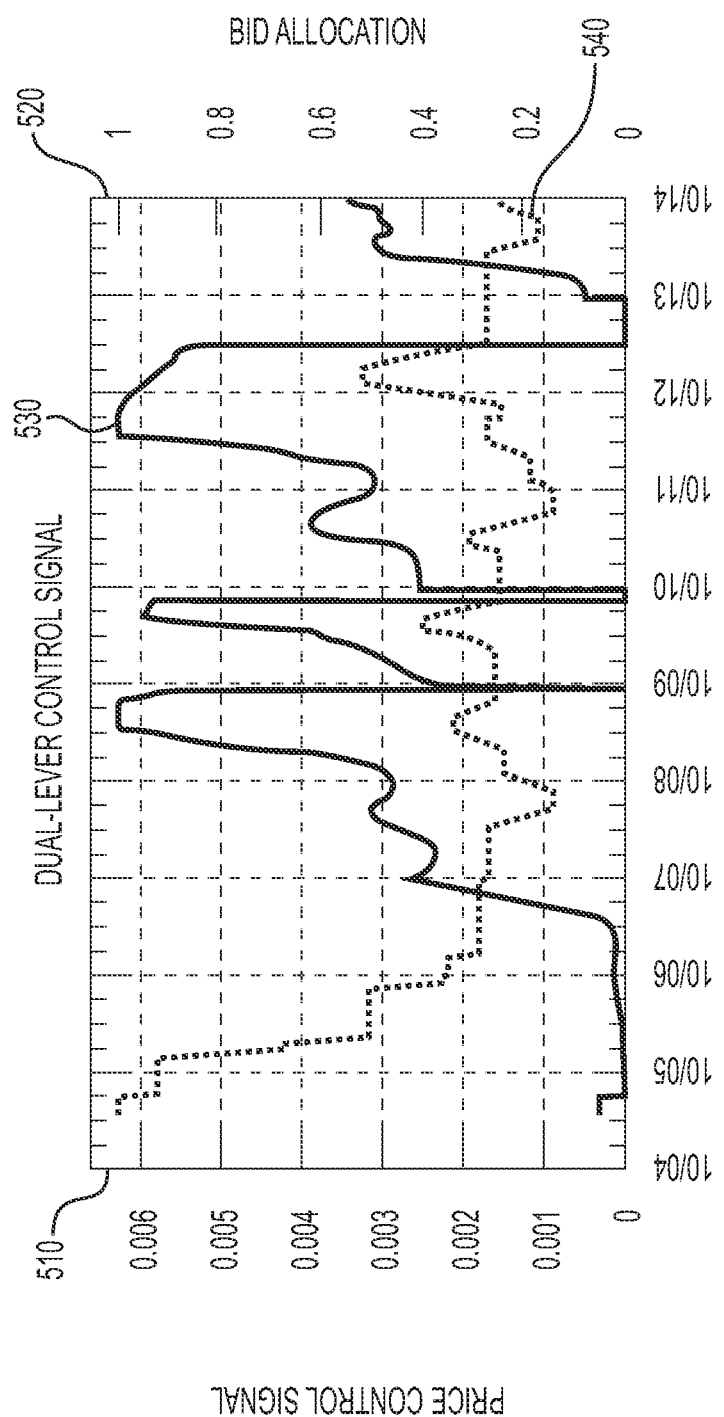
FIG. 5 depicts a graphical representation of campaign control signals in a system for control of online campaigns for distributing online content.

FIG. 5 depicts a graphical representation of campaign control signals in a system for control of online campaigns for distributing online content. As shown in FIG. 5, a dual-lever control system, such as may be used in the environments depicted in FIGS. 3 and 4, may utilize a price control signal 540 and a bid allocation signal 530. However, a dual-lever campaign control system, when the bid allocation signal is smaller than 1, may submit bids for only a fraction of available impressions and may not participate in the bidding of some high ROI impressions, which may result in suboptimal cost performance. A campaign control system, according to one or more environments, adapted to maintain a bid allocation signal of 1 is described below with respect to FIGS. 6-17.

In the figures below, certain notation will be used to discuss signals, variables, and configurable parameters. The notation used is provided below in Tables 1 and 2.

TABLE 1

Signals and Variables

| Name | Notation | Description | Range |
|---|---|---|---|
| Day | d | Integer representation of the day | $d \in \mathbb{N}$ |
| Time Sample | k | Integer representation of the time sample | $k \in \mathbb{N}$ |
| Daily Budget | $r_D(d)$ | Target spending on day d | $r_D(d) \in (0, \infty)$ |
| Marginal Budget | $r_M(k)$ | Target spending at time sample k | $r_M(k) \in (0, \infty)$ |
| CPX Constraint | $r_c(k)$ | Maximum cost per event set by provider. Empty if no constraint | $r_c(k) \in (0, \infty)$ |
| Observed Revenue Spending | $y_r(k)$ | Measured actual revenue spending at time sample k | $y_r(k) \in [0, \infty)$ |
| Observed Number of Events | $y_e(k)$ | Measured number of events at time sample k | $y_e(k)$ is a non-negative integer |
| Short-Horizon Estimated CPX | $\hat{y}_c^{short}(k)$ | Estimated CPX in a short time horizon | $\hat{y}_c^{short}(k) \in [0, \infty)$ |
| Long-Horizon Estimated CPX | $\hat{y}_c^{long}(k)$ | Estimated CPX in a long time horizon | $\hat{y}_c^{long}(k) \in [0, \infty)$ |
| Revenue Control Signal | $u_r(k)$ | It is generated by the revenue controller at time sample k | $u_r(k) \in [u_{min}, u_{max}]$ |
| CPX Control Signal | $u_c(k)$ | It is generated by the cost-per-event (CPX) controller at time sample k | $u_c(k) \in [u_{min}, u_{max}]$ |
| Final Price Control Signal | u(k) | It is sent to the bid generator to compute bid price at time sample k | u(k) depends on $u_r(k)$ and $u_c(k)$ |
| Revenue Plant Gain Estimate | $g_r(k)$ | Estimated revenue plant gain (slope of the control-spend response curve) at time sample k | $g_r(k) \in (0, \infty)$ |
| CPX Plant Gain Estimate | $g_c(k)$ | Estimated CPX plant gain (slope | $g_c(k) \in (0, \infty)$ |

TABLE 1-continued

Signals and Variables

| Name | Notation | Description | Range |
|---|---|---|---|
| Revenue Response Function | $f_r(u)$ | of the control-CPX response curve) at time sample k. It maps a price control signal u to the revenue spending $y_r$. $f_r(u)$ can be represented by a set of parameters or a collection of $(u, y_r)$. | one-on-one mapping |
| CPX Response Function | $f_c(u)$ | It maps a price control signal u to the cost per event $y_c$. $f_c(u)$ can be represented by a set of parameters or a collection of $(u, y_c)$. | one-on-one mapping |
| Revenue Control Reset Signal | $u_{s2r}(k)$ | Control supervisor sends this signal to revenue controller to reset its states | $u_{s2r}(k) \in R^+$ or $u_{s2r}(k) = [\ ]$ |
| CPX Control Reset Signal | $u_{s2c}(k)$ | Control supervisor sends this signal to CPX controller to reset its states | $u_{s2c}(k) \in R^+$ or $u_{s2c}(k) = [\ ]$ |

TABLE 2

Configurable Parameters

| Name | Notation | Description | Range |
|---|---|---|---|
| Interval Parameter | $\Delta$ | Change in the independent variable for numerically calculating derivative | $\Delta \in (0, \infty)$ |
| Delay Sample | S | Specify how many samples the price control signal is held for | $S \in N$ |
| Sampling Time | $T_s$ | The control system is executed every $T_s$ hour | $T_s \in R^+$ (a typical value is 0.25) |
| Daily Seasonality Model | $(\beta_i, \phi_i)$ | $\beta_i$'s and $\phi_i$'s are parameters describing the daily seasonality model | $\beta_i \in R, \phi_i \in R$ |
| Latency Model | $\gamma_i$ | $\gamma_i$'s describe the distribution of latency between measured revenue and actual revenue | $\gamma_i \in R^+$ |
| Initial Control Signal | $U_0$ | A campaign level parameter to initialize price control | $U_0 \in R^+$ |
| Minimum Price Control | $u_{min}$ | Campaign-level allowed smallest price control signal | $u_{min} \in R^+$ |
| Maximum Price Control | $u_{max}$ | Campaign-level allowed largest price control signal | $u_{max} \in R^+$ |
| Revenue Integrator Parameter | $T_r$ | Revenue control tuning parameter that can be adjusted for response speed | $T_r \in R^+$ |
| Revenue Anti-Windup Parameter | $T_{r,w}$ | Revenue control tuning parameter that protects against windup | $T_{r,w} \in R^+$ |
| Revenue Controller Gain | $K_{r,l}$ | Revenue control tuning parameter that can be adjusted for control aggressiveness and robustness | $K_{r,l} \in R^+$ |
| Revenue Control Decrease Bound | $\delta_{r,low}$ | $u_r(k)$ cannot be smaller than $(1 - \delta_{r,low})u_r(k-1)$ | $0 < \delta_{r,low} < 1$ |
| Revenue Control Increase Bound | $\delta_{r,high}$ | $u_r(k)$ cannot be larger than $(1 + \delta_{r,high})u_r(k-1)$ | $\delta_{r,high} > 0$ |
| CPX Integrator Parameter | $T_c$ | CPX control tuning parameter that can be adjusted for response speed | $T_c \in R^+$ |
| CPX Anti-Windup Parameter | $T_{c,w}$ | CPX control tuning parameter that protects against windup | $T_{c,w} \in R^+$ |
| CPX Controller Gain Parameter | $K_{c,l}$ | CPX control tuning parameter that can be adjusted for control aggressiveness and robustness | $K_{c,l} \in R^+$ |
| CPX Control Decrease Bound | $\delta_{c,low}$ | $u_c(k)$ cannot be smaller than $(1 - \delta_{c,low})u_c(k-1)$ | $0 < \delta_{c,low} < 1$ |
| CPX Control Increase Bound | $\delta_{c,high}$ | $u_c(k)$ cannot be larger than $(1 - \delta_{c,low})u_c(k-1)$ | $\delta_{c,high} > 0$ |
| Long-Horizon Buffer Size | $N^{long}$ | Number of measurement samples used to estimate long-horizon CPX | $N^{long} \in N$ |
| Short-Horizon Buffer Size | $N^{short}$ | Number of measurement samples used to estimate short-horizon CPX | $N^{short} \in N$, $N^{short} < N^{long}$ |

FIG. 6 depicts a control system for allocation-free control of online campaigns for distributing online content, according to one or more embodiments. The control system may be configured to utilize data observed in a content distribution system, such as an advertising marketplace, to control bids placed on subsequent available impressions. By controlling the bids, the control system may provide desired impressions to a provider at an optimal price. As shown in FIG. 6, a campaign control system 406 may include a plant gain estimator 605, delay modules 610 and 630, a reference generator 615, a revenue controller 620, a control supervisor 625, a CPX controller 640, a CPX estimator 650, and a content distribution network, such as advertising network 635. Each of these components may communicate with each other by way of a bus, network, or shared memory. The operation of each of these components, including their input parameters and generated outputs, will be described in detail below with respect to FIGS. 7A-12B.

Figures 7A, 7B:
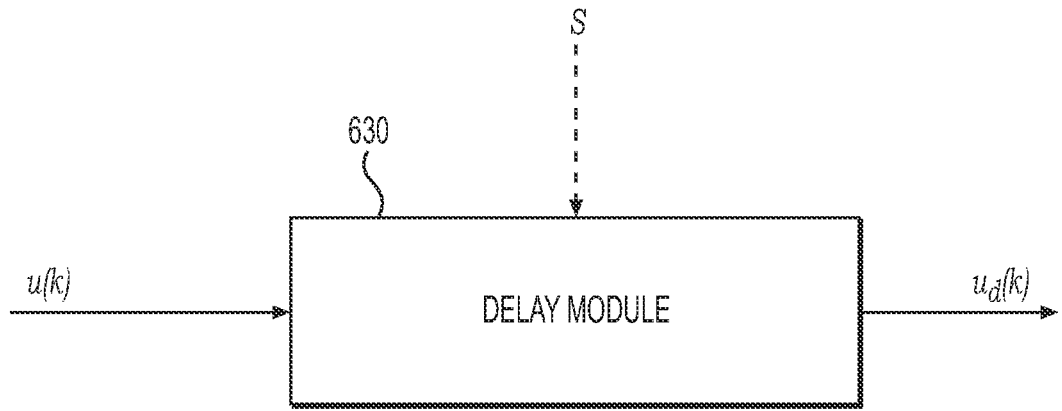
FIG. 7A depicts a delay module in a control system for allocation-free control of online campaigns for distributing online content, according to one or more embodiments.
FIG. 7B depicts a sample algorithm for a delay module in a control system for allocation-free control of online campaigns for distributing online content, according to one or more embodiments.

FIG. 7A depicts a delay module, such as delay modules 610 and 630 depicted in FIG. 6, in a control system for allocation-free control of online campaigns for distributing online content, according to one or more embodiments. The delay module is configured to delay a provided control signal by a specified period. The delay module may take as inputs a control signal u(k), and a delay parameter S. The delay module may store the control signal for a period of time corresponding to the delay parameter before outputting the delayed control signal $u_d(k)$, thus allowing a control signal at time sample k to be used at time sample k+S. The delayed control signal is not otherwise modified. FIG. 7B depicts a sample algorithm for a delay module, according to one or more embodiments, the depiction and substance of which is hereby incorporated into this description of the above module.

Figures 8A, 8B:
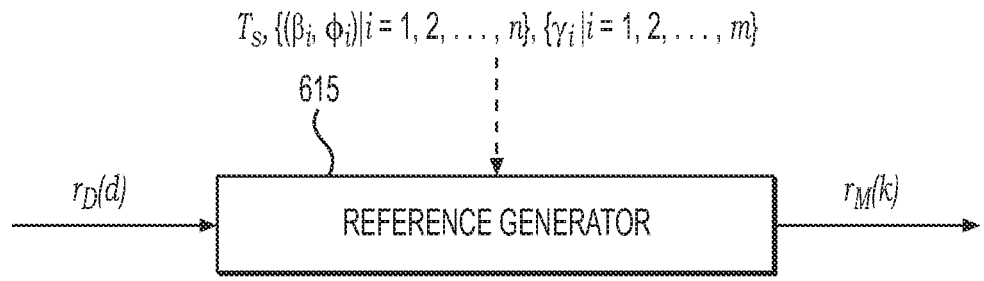
FIG. 8A depicts a reference generator in a control system for allocation-free control of online campaigns for distributing online content, according to one or more embodiments.
FIG. 8B depicts a sample algorithm for a reference generator in a control system for allocation-free control of online campaigns for distributing online content, according to one or more embodiments.

FIG. 8A depicts a reference generator, such as reference generator 615 depicted in FIG. 6, in a control system for allocation-free control of online campaigns for distributing online content, according to one or more embodiments. The reference generator is configured to compute a marginal delivery reference. The reference generator may take as inputs a sampling time $T_s$, a daily delivery budget $r_D(d)$, a seasonality model, and a latency model. The sampling time $T_s$ specifies a period in which the campaign controller executes, such as for example, executing every $T_s$ hour. For example, $T_s$ may be set to 0.25 to cause the campaign controller to execute every 15 minutes. The seasonality model includes parameters $\beta_i$ and $\phi_i$ describing a daily seasonality model. Seasonality as used herein is a generalization of time-of-day pattern. Examples of seasonality are time-of-day, day-of-week, day-of-month, and annual patterns. The latency model includes parameters $\gamma_i$ describing a distribution of latency between measured revenue and actual revenue. As used herein, revenue may refer to actual dollars sent, actual impressions awarded or actual events delivered. The reference generator may compute a marginal delivery reference $r_M(k)$ at sample time k. The operation of a reference generator, including seasonality models and latency models, is discussed further in U.S. Pat. No. 7,835,938, issued on Nov. 16, 2010 and U.S. patent application Ser. No. 15/628,493, filed on Jun. 20, 2017, the entire disclosures of each of which are incorporated herein by reference. FIG. 8B depicts a sample algorithm for a reference generator, according to one or more embodiments, the depiction and substance of which is hereby incorporated into this description of the above module.

FIG. 9A depicts a plant gain estimator, such as plant gain estimator 605 depicted in FIG. 6, in a control system for allocation-free control of online campaigns for distributing online content, according to one or more embodiments. The plant gain estimator is configured to compute a revenue plant gain estimate and a CPX plant gain estimate. Plant gain may be defined as a relative impact on the plant when the control signal is changed. For example and without limitation, if the plant gain between control signal and revenue at some point is g and the control signal is increased by some amount d, then the revenue is expected to increase by approximately g multiplied by d. The plant gain estimator may take as inputs a delayed control signal $u_d(k)$, such as a delayed control signal generated by a control supervisor, a revenue response function $f_r(u)$, a CPX response function $f_c(u)$, and a configurable parameter $\Delta$. The revenue response function may represent an estimated revenue plant gain (slope of the control-spend response curve) at time sample k. The CPX response function may represent an estimated CPX plant gain (e.g., slope of the control-CPX response curve) at time sample k. The configurable parameter $\Delta$ may be unnecessary when first-order derivatives of the revenue response function and the CPX response function can be computed analytically such as the methodology described in U.S. patent application Ser. No. 15/438,607, filed on Feb. 21, 2017, the entire disclosure of which is incorporated herein by reference, in which the response curve is a weighted summation of the polynomial basis functions. Otherwise, the first-order derivatives of the revenue response function and the CPX response function may be numerically calculated using the configurable parameter $\Delta$. The plant gain estimator may compute a revenue plant gain estimate $g_r(k)$ and a CPX plant gain estimate $g_c(k)$. The revenue plant gain estimate may be calculated as a first-order derivative of the revenue response function and the CPX plant gain estimate may be calculated as a first-order derivative of the CPX response function. FIG. 9B depicts a sample algorithm for a plant gain estimator, according to one or more embodiments, the depiction and substance of which is hereby incorporated into this description of the above module.

Figure 10A:
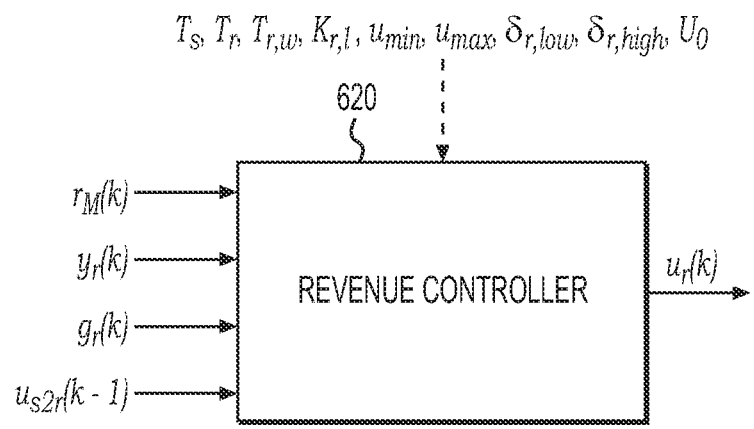
FIG. 10A depicts a revenue controller in a control system for allocation-free control of online campaigns for distributing online content, according to one or more embodiments.

FIG. 10A depicts a revenue controller, such as revenue controller 620 depicted in FIG. 6, in a control system for allocation-free control of online campaigns for distributing online content, according to one or more embodiments. The revenue controller may generate a revenue control signal. The revenue controller may take as inputs a marginal delivery reference $r_M(k)$ at sample time k, such as may be generated by the reference generator, an observed revenue spending $y_r(k)$ at sample time k, a revenue plant gain estimate $g_r(k)$, such as may be generated by the plant gain estimator, and a revenue controller reset signal at time sample k−1, $u_{s2r}(k-1)$, such as may be generated by the control supervisor. The revenue controller may also receive configurable parameters: sampling time $T_s$, revenue integrator parameter $T_r$, which can be adjusted for response speed, revenue anti-windup parameter $T_{r,w}$, which may protect against windup, revenue controller gain parameter $K_{r,l}$, which can be adjusted to control aggressiveness and robustness of the generated revenue control signal, a minimum price control $u_{min}$, a maximum price control $u_{max}$, a revenue control decrease bound $\delta_{r,low}$, a revenue control increase bound $\delta_{r,high}$, and an initial control signal $U_0$ to initialize the price control. The revenue controller may generate a revenue control signal $u_r(k)$. For example, the revenue control signal $u_r(k)$ may be calculated using a proportional-integral (PI) controller, although other embodiments may be used. FIG. 10B depicts a sample algorithm for a revenue controller, the depiction and substance of which is hereby incorporated into this description of the above module. In FIG. 10B, the configurable parameters $u_{min}$, $u_{max}$, $\delta_{r,low}$ and $\delta_{r,high}$ define a lower bound and an upper bound for how much the revenue control signal at time sample k, $u_r(k)$, can change from the control signal at the previous time sample k−1. These added bounds prevent the occurrence of excessive oscillation from one time sample to another sample, which improves the stability of the campaign control system. When both integral action in the PI controller and bounds in the control signal are present in the system, the integrator state may grow very large in the beginning of campaign control when the difference between $r_M(k)$ and $y_r(k)$ is large, which results in large and prolonged transient response in the system output. This undesired windup effect is prevented by the equation in Line 36 in FIG. 10B, where the integrator state is adjusted by the amount adjusted by the bounds in the revenue control signal.

Figure 11A:
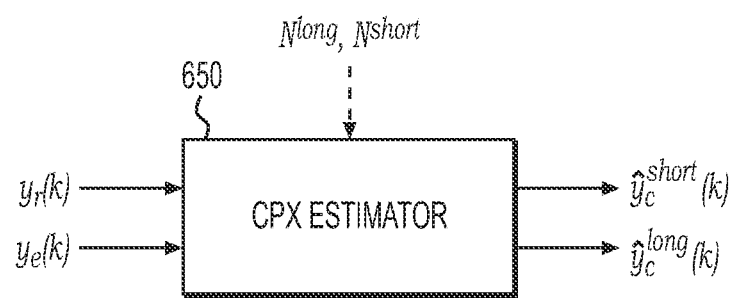
FIG. 11A depicts a CPX estimator in a control system for allocation-free control of online campaigns for distributing online content, according to one or more embodiments.

FIG. 11A depicts a CPX estimator, such as CPX estimator 650 depicted in FIG. 6, in a control system for allocation-free control of online campaigns for distributing online content, according to one or more embodiments. The CPX estimator may take as inputs an observed revenue spending $y_r(k)$ at sample time k, and an observed number of events $y_e(k)$ at sample time k. The CPX estimator 650 may also receive as configurable parameters a long-horizon buffer size $N^{long}$ and a short-horizon buffer size $N^{short}$. The CPX estimator 650 may compute a short-horizon estimated CPX $\hat{y}_c^{short}(k)$ and a long-horizon estimated CPX $\hat{y}_c^{long}(k)$. FIG. 11B depicts a sample algorithm for a CPX estimator, according to one or more embodiments, the depiction and substance of which is hereby incorporated into this description of the above module.

FIG. 12A depicts a control supervisor, such as control supervisor 625 depicted in FIG. 6, in a control system for allocation-free control of online campaigns for distributing online content, according to one or more embodiments. The control supervisor may be configured to compute a price control signal. The control supervisor may take as inputs a revenue control signal $u_r(k)$, such as may be computed by the revenue controller 620 and a CPX control signal $u_c(k)$, such as may be computed by the CPX controller 640. The control supervisor 625 may compute a price control signal $u(k)$ to be sent to the bid generator, such as advertising network 635 depicted in FIG. 6, to compute a bid price at time sample k. The control supervisor may further generate a revenue controller reset signal $u_{s2r}(k)$ and a CPX control reset signal $u_{s2c}(k)$. FIG. 12B depicts a sample algorithm for a control supervisor in a control system for allocation-free control of online campaigns for distributing online content, according to one or more embodiments, the depiction and substance of which is hereby incorporated into this description of the above module.

FIG. 13A depicts a CPX controller, such as CPX controller 640 depicted in FIG. 6, in a control system for allocation-free control of online campaigns for distributing online content, according to one or more embodiments. The CPX controller is configured to compute a CPX control signal. The CPX controller may take as inputs a CPX constraint, which may specify a maximum cost per event set by a content provider, a short-horizon estimated CPX $\hat{y}_c^{short}(k)$ and a long-horizon estimated CPX $\hat{y}_c^{long}(k)$, such as may be calculated by the CPX estimator 650, a CPX plant gain estimate $g_c(k)$, such as may be calculated by the plant gain estimator 605, and a CPX control reset signal $u_{s2c}(k)$, which may be delayed by delay module 630. The CPX controller may also receive configurable parameters: sampling time $T_s$, CPX integrator parameter $T_c$, which can be adjusted for response speed, CPX anti-windup parameter $T_{c,w}$, which may protect against windup, revenue controller gain parameter $K_{c,I}$, which can be adjusted to control aggressiveness and robustness of the generated CPX control signal, a minimum price control $u_{min}$, a maximum price control $u_{max}$, a cost control decrease bound $\delta_{c,low}$, a cost control increase bound $\delta_{c,high}$ and an initial control signal $U_0$ to initialize the price control. The CPX controller may compute a CPX control signal $u_c(k)$. For example, the control signal $u_c(k)$ may be calculated using a proportional-integral controller, although other embodiments may be used. FIGS. 13B-C depict a sample algorithm for a CPX controller, according to one or more embodiments, the depiction and substance of which is hereby incorporated into this description of the above module.

Figure 14:
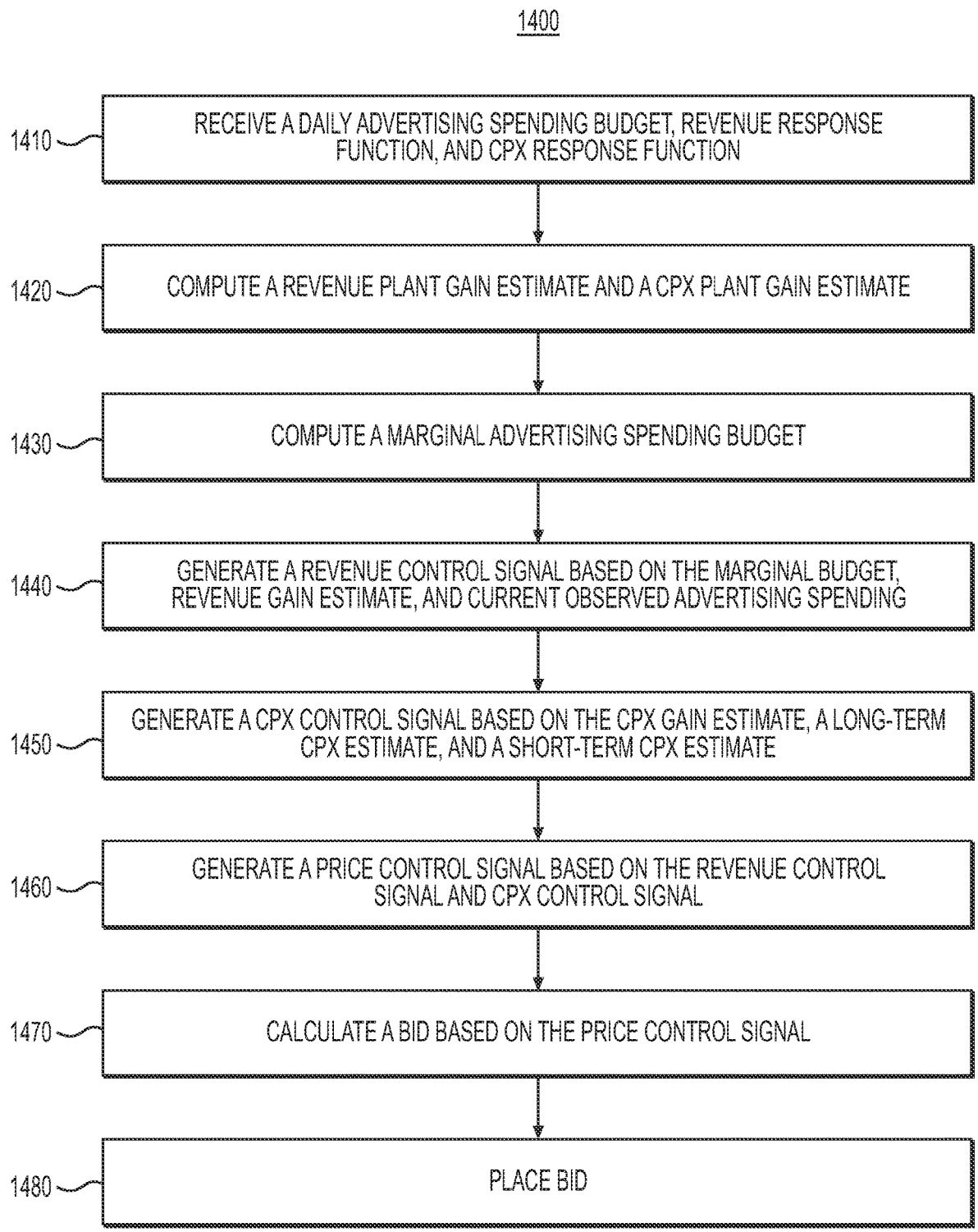
FIG. 14 depicts a flow chart of a method for allocation-free control of online campaigns for distributing online content, according to one or more embodiments.

FIG. 14 depicts a flow chart of a method 1400 for allocation-free control of online campaigns for distributing online content, according to one or more embodiments. As shown in FIG. 14, at operation 1410, a campaign controller, such as campaign controller 406 depicted in FIG. 4 and in greater detail in FIG. 6, may receive a daily spending budget, revenue response function, and CPX response function. At operation 1420, the campaign controller may compute a revenue plant gain estimate and a CPX plant gain estimate. At operation 1430, the campaign controller may compute a marginal content distribution spending budget, such as an advertising spending budget, such as by reference generator 615 depicted in FIG. 6. At operation 1440, the campaign controller may generate a revenue control signal, such as by revenue controller 620 depicted in FIG. 6, based on the marginal budget, revenue plant gain estimate, such as may be generated by plant gain estimator 605 depicted in FIG. 6, and current observed content distribution spending. At operation 1450, the campaign controller may generate a CPX control signal, such as by CPX controller 640 depicted in FIG. 6, based on the CPX plant gain estimate, such as may be generated by plant gain estimator 605 depicted in FIG. 6, a long-term CPX estimate, and a short-term CPX estimate, such as may be generated by CPX estimator 605 depicted in FIG. 6. At operation 1460, the campaign controller may generate a price control signal based on the revenue control signal and the CPX control signal. At operation 1470, the campaign controller may calculate a bid for impressions based on the price control signal. At operation 1480, the campaign controller may place the calculated bid.

Figure 15A:
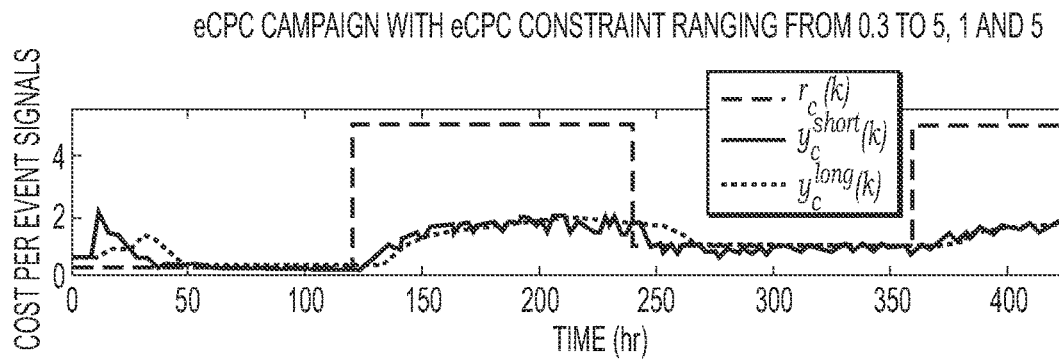
FIGS. 15A-D depict graphical representations of control signals and activity in a system for allocation-free control of online campaigns for distributing online content, according to one or more embodiments.
Figure 15B:
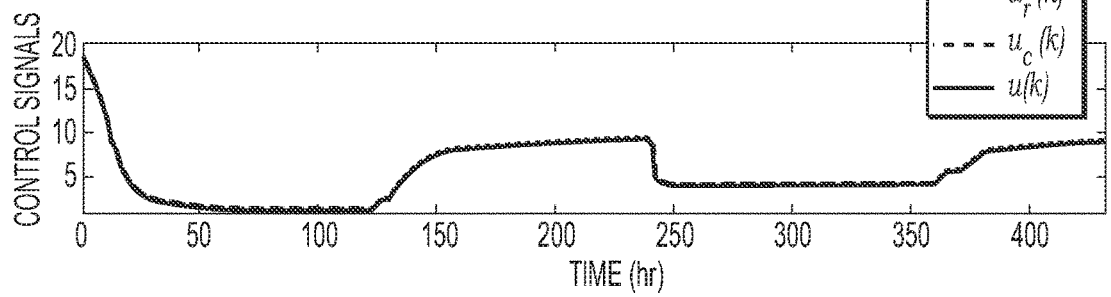
Figure 15C:
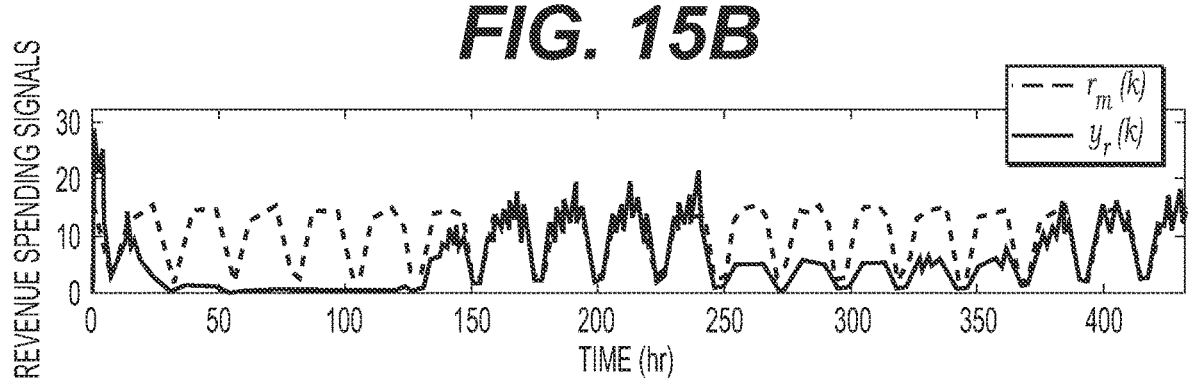
Figure 15D:
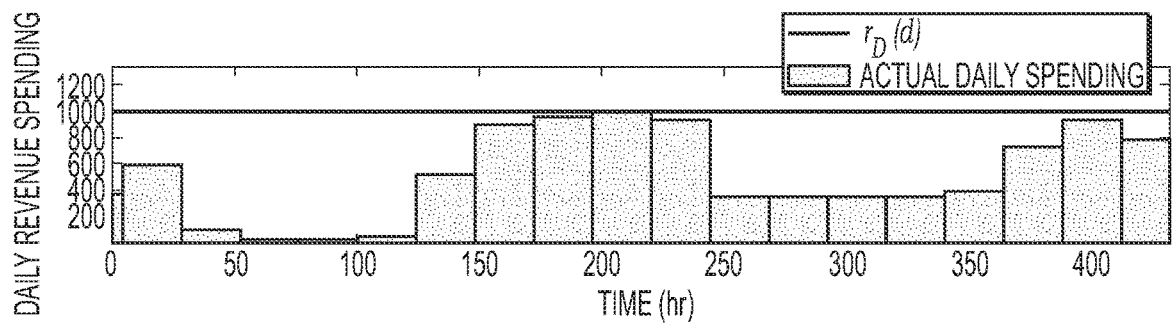

FIGS. 15A-D depict graphical representations of control signals and activity in a system for allocation-free control of online campaigns for distributing online content, according to one or more embodiments. In FIGS. 15A-15D, a CPX constraint varies from 0.3 to 5, to 1, and to 5 over the course of a campaign. As shown in FIG. 15A, a short-horizon estimated CPX and a long-horizon estimated CPX each may increase or decrease in response to increases and decreases in the CPX constraint. However, the changes in the estimates may lag behind the changes in the CPX constraint. In addition, the long-horizon estimated CPX may tend to smooth the variations in the short-horizon estimated CPX. As shown in FIG. 15B, the revenue control signal, CPX control signal, and final price control signal may vary in response to the increases and decreases in the CPX constraint. As shown in FIG. 15C, revenue control signal may vary over each 24-hour period, but may not be affected by the CPX constraint. However, the observed spending over each 24-hour may vary in response to the CPX constraint. As shown in FIG. 15D, the actual daily spending may vary in response to the CPX constraint, although the daily budget remains a constant.

Figure 16A:
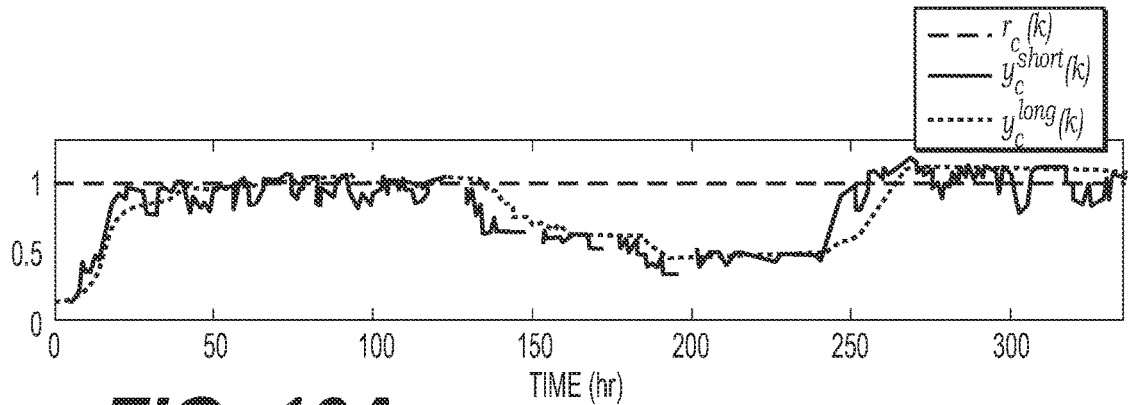
FIGS. 16A-D depict graphical representations of control signals and activity in a system for allocation-free control of online campaigns for distributing online content, according to one or more embodiments.
Figure 16B:
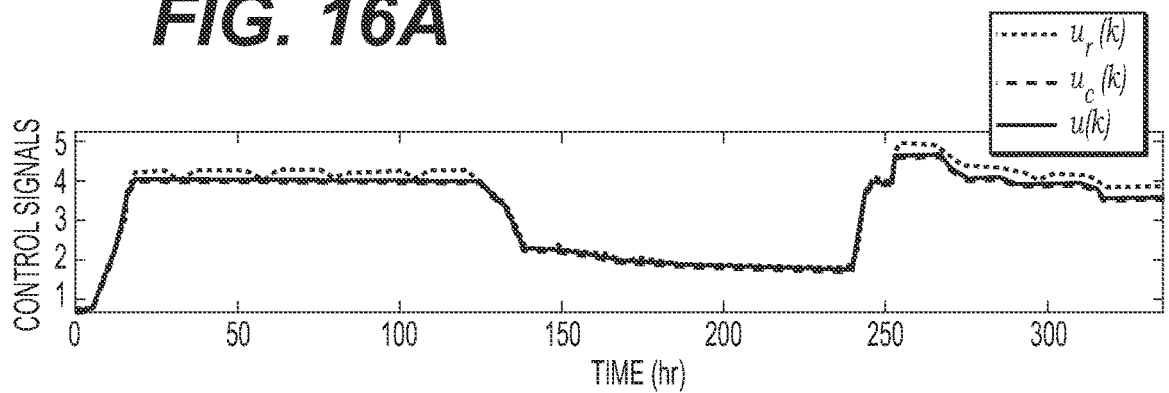
Figure 16C:
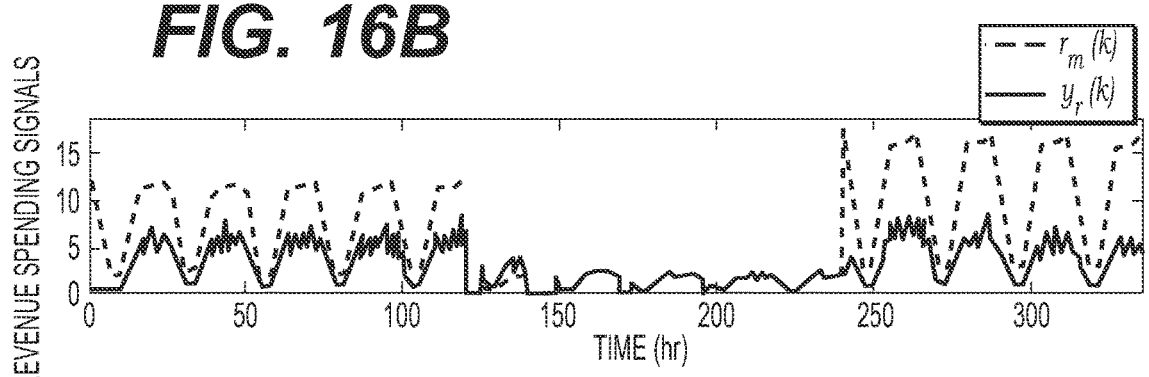
Figure 16D:
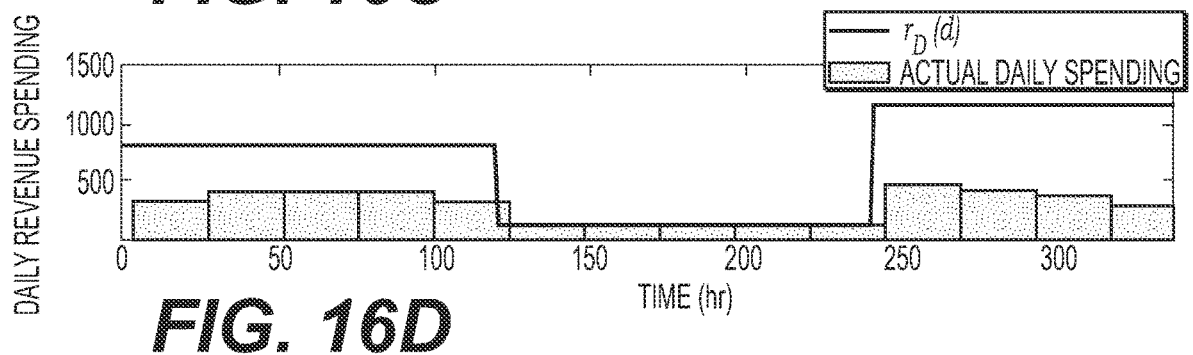

FIGS. 16A-D depict graphical representations of control signals and activity in a system for allocation-free control of online campaigns for distributing online content, according to one or more embodiments. In FIGS. 16A-16D, a daily budget varies from $800 to $150, and to $1150 over the course of a campaign. As shown in FIG. 16A, a CPX constraint may remain constant over the course of the campaign, while a short-horizon estimated CPX and a long-horizon estimated CPX each may increase or decrease in response to increases and decreases in the daily budget. However, the changes in the estimates may lag behind the changes in the daily budget. In addition, the long-horizon estimated CPX may tend to smooth the variations in the short-horizon estimated CPX. As shown in FIG. 16B, the revenue control signal, CPX control signal, and final price control signal may vary in response to the increases and decreases in the daily budget. As shown in FIG. 16C, the revenue control signal and the observed spending over each 24-hour may vary in response to the daily budget. However, the magnitude of changes to the revenue control signal may be greater than the magnitude of changes to the observed spending. As shown in FIG. 16D, actual daily spending may not reach the daily budget, due to the CPX constraint.

Figure 17:
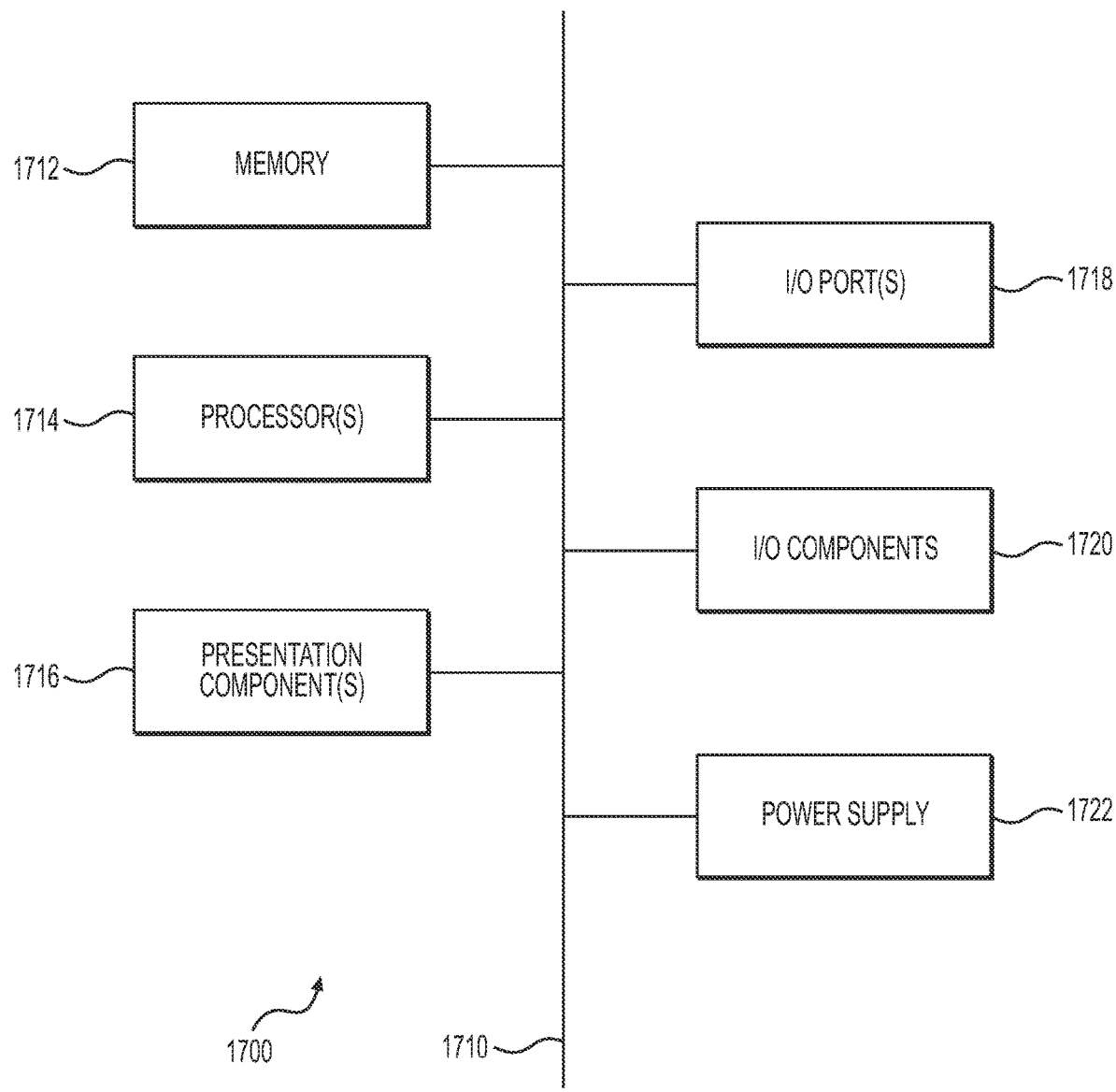
FIG. 17 is a block diagram of an example computing device in which one or more embodiments of the present disclosure may be employed.

Having described a campaign controller according to one or more embodiments, an example operating environment in which embodiments of the present invention may be implemented is described below in order to provide a general context for various aspects of the present invention. Referring to FIG. 17, an illustrative operating environment, or computing platform, for implementing embodiments of the present invention is shown and designated generally as computing device 1700. Computing device 1700 is but one example of a suitable computing environment and is not intended to suggest any limitation as to the scope of use or functionality of the invention. Neither should the computing device 1700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 17, computing device 1700 includes a bus 1710 that directly or indirectly couples the following devices: memory 1712, one or more processors 1714, one or more presentation components 1716, input/output (I/O) ports 1718, I/O components 1720, and an illustrative power supply 1722. Bus 1710 represents what may be one or more busses (such as an address bus, data bus, or combination thereof). Although depicted in FIG. 17, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 1716 while also being one of the I/O components 1720. As another example, processors have memory integrated therewith in the form of cache; however, there is no overlap between the one or more processors 1714 and the memory 1712. A person having ordinary skill in the art will readily recognize that such is the nature of the art, and it is reiterated that the diagram of FIG. 17 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 1700 of FIG. 17 and any other reference to "computing device," unless the context clearly indicates otherwise.

Computing device 1700 typically includes a variety of computer-readable media. Computer-readable media can be any available media that can be accessed by computing device 1700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1712 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 1700 includes one or more processors 1714 that read data from various entities such as memory 1712 or I/O components 1720. Presentation component(s) 1716 present data indications to a user or other device. Illustrative presentation components include a display device, speaker, printing component, vibrating component, etc.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for allocation-free control of online campaigns for distributing online content, the method comprising:
generating one or more control signals, the one or more control signals including a revenue control signal and a cost per event (CPX) control signal;
generating a price control signal as a smaller of the CPX control signal and the revenue control signal;
transmitting a single control signal consisting of the generated price control signal to a bid generator; and
calculating, by the bid generator, a bid for one or more impressions based on the single control signal,
wherein an amount of change in the revenue control signal between a first time sample and a second time sample is bound by one or more configurable parameters.

2. The computer-implemented method of claim 1, further comprising:
receiving a daily content distribution spending budget and one or more response functions;
calculating one or more plant gain estimates based on the one or more response functions; and
calculating a marginal content distribution spending budget based on the daily content distribution spending budget,
wherein the marginal content distribution spending budget is calculated based on a daily seasonality model and a latency model, and wherein the revenue control signal is generated based on the calculated marginal budget and the calculated one or more plant gain estimates.

3. The computer-implemented method of claim 2, wherein the one or more response functions comprise a revenue response function and a cost per event (CPX) response function, and
the one or more plant gain estimates comprise a revenue plant gain estimate and a cost per event (CPX) plant gain estimate.

4. The computer-implemented method of claim 2, wherein generating the one or more control signals comprises:
generating the revenue control signal based on the marginal budget, the revenue plant gain estimate, and current observed content distribution spending; and
generating the CPX control signal based on the CPX plant gain estimate, a long-term CPX estimate, and a short-term CPX estimate.

5. The computer-implemented method of claim 3, wherein the revenue plant gain estimate is calculated as a first-order derivative of the revenue response function and the CPX plant gain estimate is calculated as a first-order derivative of the CPX response function.

6. The computer-implemented method of claim 5, wherein the revenue control signal or the CPX control signal is generated using a proportional-integral controller.

7. A system for allocation-free control of online campaigns for distributing online content, the system comprising:
a data storage device storing instructions for allocation-free control of online campaigns for distributing online content in an electronic storage medium; and
a processor configured to execute the instructions to perform a method including:
generating one or more control signals, the one or more control signals including a revenue control signal and a cost per event (CPX) control signal;
generating a price control signal as a smaller of the CPX control signal and the revenue control signal;
transmitting a single control signal consisting of the generated price control signal to a bid generator; and
calculating, by the bid generator, a bid for one or more impressions based on the single control signal,
wherein an amount of change in the revenue control signal between a first time sample and a second time sample is bound by one or more configurable parameters.

8. The system of claim 7, wherein the system is further configured for:
receiving a daily content distribution spending budget and one or more response functions;
calculating one or more plant gain estimates based on the one or more response functions; and
calculating a marginal content distribution spending budget based on the daily content distribution spending budget,
wherein the marginal content distribution spending budget is calculated based on a daily seasonality model and a latency model, and
wherein the revenue control signal is generated based on the calculated marginal budget and the calculated one or more plant gain estimates.

9. The system of claim 8, wherein the one or more response functions comprise a revenue response function and a cost per event (CPX) response function, and
the one or more plant gain estimates comprise a revenue plant gain estimate and a cost per event (CPX) plant gain estimate.

10. The system of claim 8, wherein generating the one or more control signals comprises:
generating the revenue control signal based on the marginal budget, the revenue plant gain estimate, and current observed content distribution spending; and
generating the CPX control signal based on the CPX plant gain estimate, a long-term CPX estimate, and a short-term CPX estimate.

11. The system of claim 9, wherein the revenue plant gain estimate is calculated as a first-order derivative of the revenue response function and the CPX plant gain estimate is calculated as a first-order derivative of the CPX response function.

12. The system of claim 11, wherein the revenue control signal or the CPX control signal is generated using a proportional-integral controller.

13. A non-transitory machine-readable medium storing instructions that, when executed by a computing system, causes the computing system to perform a method for allocation-free control of online campaigns for distributing online content, the method including:
generating one or more control signals, the one or more control signals including a revenue control signal and a cost per event (CPX) control signal;
generating a price control signal as a smaller of the CPX control signal and the revenue control signal;
transmitting a single control signal consisting of the generated price control signal to a bid generator; and
calculating, by the bid generator, a bid for one or more impressions based on the single control signal,
wherein an amount of change in the revenue control signal between a first time sample and a second time sample is bound by one or more configurable parameters.

14. The non-transitory machine-readable medium of claim 13, the method further comprising:
receiving a daily content distribution spending budget and one or more response functions;
calculating one or more plant gain estimates based on the one or more response functions; and
calculating a marginal content distribution spending budget based on the daily content distribution spending budget,
wherein the marginal content distribution spending budget is calculated based on a daily seasonality model and a latency model, and
wherein the revenue control signal is generated based on the calculated marginal budget and the calculated one or more plant gain estimates.

15. The non-transitory machine-readable medium of claim 14, wherein the one or more response functions comprise a revenue response function and a cost per event (CPX) response function, and
the one or more plant gain estimates comprise a revenue plant gain estimate and a cost per event (CPX) plant gain estimate.

16. The non-transitory machine-readable medium of claim 14, wherein generating the one or more control signals comprises:
generating the revenue control signal based on the marginal budget, the revenue plant gain estimate, and current observed content distribution spending; and generating the CPX control signal based on the CPX plant gain estimate, a long-term CPX estimate, and a short-term CPX estimate.

17. The non-transitory machine-readable medium of claim 15, wherein the revenue plant gain estimate is calculated as a first-order derivative of the revenue response function and the CPX plant gain estimate is calculated as a first-order derivative of the CPX response function.

* * * * *